US011503290B2

(12) United States Patent
Gao et al.

(10) Patent No.: US 11,503,290 B2
(45) Date of Patent: Nov. 15, 2022

(54) VIDEO ENCODER, VIDEO DECODER AND METHODS

(71) Applicant: HUAWEI TECHNOLOGIES CO., LTD., Guangdong (CN)

(72) Inventors: Han Gao, Munich (DE); Semih Esenlik, Munich (DE); Biao Wang, Shenzhen (CN); Anand Meher Kotra, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/317,126

(22) Filed: May 11, 2021

(65) Prior Publication Data

US 2021/0266541 A1   Aug. 26, 2021

Related U.S. Application Data

(63) Continuation of application No. PCT/CN2019/117526, filed on Nov. 12, 2019.

(Continued)

(51) Int. Cl.
*H04N 19/119* (2014.01)
*H04N 19/105* (2014.01)
(Continued)

(52) U.S. Cl.
CPC ......... *H04N 19/119* (2014.11); *H04N 19/105* (2014.11); *H04N 19/132* (2014.11); (Continued)

(58) Field of Classification Search
CPC .. H04N 19/1883; H04N 19/105; H04N 19/70; H04N 19/176; H04N 19/167; H04N 19/132; H04N 19/96; H04N 19/119
See application file for complete search history.

(56) References Cited

U.S. PATENT DOCUMENTS

| 2014/0198846 A1* | 7/2014 | Guo | ........................ H04N 19/59 |
| | | | 375/240.12 |
| 2017/0272782 A1* | 9/2017 | Li | .......................... H04N 19/50 |

(Continued)

FOREIGN PATENT DOCUMENTS

| CN | 108886613 A | 11/2018 |
| JP | 2019512963 A | 5/2019 |

(Continued)

OTHER PUBLICATIONS

Zhao Wang et al.,"Local-Constrained Quadtree Plus Binary Tree Block Partition Structure for Enhanced Video Coding",VCIP 2016, Nov. 27 30, 2016, Chengdu, China,total:4pages.

(Continued)

*Primary Examiner* — Neil R Mikeska
(74) *Attorney, Agent, or Firm* — Womble Bond Dickinson (US) LLP

(57) ABSTRACT

A method of and an apparatus for encoding and decoding are provided. The method comprises determining whether, as a condition for not applying binary splitting to a current block, determining whether the current block is a boundary block and whether a multi-type tree depth resulting from multi-type tree splitting of a quadtree leaf, is equal to or greater than a sum of a maximum boundary multi-type partition depth and a depth offset. Binary splitting is applied in accordance with a result of determining whether said condition is satisfied.

22 Claims, 8 Drawing Sheets

Related U.S. Application Data

(60) Provisional application No. 62/759,929, filed on Nov. 12, 2018.

(51) Int. Cl.
  *H04N 19/132* (2014.01)
  *H04N 19/176* (2014.01)
  *H04N 19/169* (2014.01)
  *H04N 19/96* (2014.01)

(52) U.S. Cl.
  CPC ....... *H04N 19/176* (2014.11); *H04N 19/1883* (2014.11); *H04N 19/96* (2014.11)

(56) References Cited

U.S. PATENT DOCUMENTS

| | | | |
|---|---|---|---|
| 2017/0347095 A1 | 11/2017 | Panusopone et al. | |
| 2017/0347096 A1 | 11/2017 | Hong et al. | |
| 2017/0347128 A1 | 11/2017 | Panusopone et al. | |
| 2018/0131943 A1* | 5/2018 | Park | H04N 19/159 |
| 2020/0053368 A1* | 2/2020 | Urban | H04N 19/159 |
| 2021/0368172 A1* | 11/2021 | Lim | H04N 19/119 |

FOREIGN PATENT DOCUMENTS

| | | |
|---|---|---|
| WO | 2018066809 A1 | 4/2018 |
| WO | 2020098649 A1 | 5/2020 |

OTHER PUBLICATIONS

Shih-Ta Hsiang et al.,"CE1.1.1.1: CU partitioning along picture boundaries",oint Video Experts Team (JVET)of ITU-T SG 16 WP 3 and ISO/IEC JTC 1/SC 29/WG 11,12th Meeting: Macao, CN, 3 Oct. 12, 2018.Document: JVET-L0080-v1,total:3pages.

Benjamin Bross et al,"Versatile Video Coding (Draft 2)", Joint Video rts Team (JVEf) of ITU-T SG 16 WP 3 and ISO/IEC JTC 1/SC 29/WG 11, 11th Meeting: iubljana, SI, Jul. 10-18, 2018, Document: JVET-K1001-v7 , total 139 pages.

Shah-Ta Hsiang et al.,"CEI.I.I.I: CU partitioning along picture boundaries",Joint Video Experts Team (JVET) of ITU-T SG 16 WP 3 and ISO/IEC JTC 1/SC 29/WG 11 ,12th Meeting: Macao, CN, Oct. 3-12, 2018,JVET-L0080-v1, total:3pages.

Zhao Wang et al, Local-Constrained Quadtree Plus Binary Tree Block Partition Structure for Enhanced Video Coding, 2016 Visual Communications and Image Processing (VCIP), Nov. 27 30, 2016, 4 pages.

Benjamin Bross et al, Versatile Video Coding (Draft 2), JVET-K1001-v6, Joint Video Experts Team (JVET) of ITU-T SG 16 WP 3 and ISO/IEC JTC 1/SC 29/WG 11, 11th Meeting: Ljubljana, SI, 10 Jul. 18, 2018, 139 pages.

MediaTek Inc., Block partitioning structure for next generation video coding, International Telecommunication Union, Study Group 16 Contribution 966 R3, COM 16 C 966 R3 ESep. 2015, 5 pages.

S.-T. Hsiang et al.,"CE1.1.1.1: CU partitioning along picture boundaries",JVET-L0080_DraftText,date Oct. 2, 2018, total:6pages.

* cited by examiner

VIDEO ENCODER, VIDEO DECODER AND METHODS

CROSS REFERENCE TO RELATED APPLICATIONS

This application is a continuation of International Application No. PCT/CN2019/117526, filed on Nov. 12, 2019, which is claims the benefit of priority to U.S. Provisional Patent Application No. 62/759,929, filed on Nov. 12, 2018. The aforementioned patent applications are hereby incorporated by reference in their entireties.

TECHNICAL FIELD

Embodiments of the present application generally relate to the field of video coding and more particularly to coding unit splitting and partitioning.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

Since the development of the block-based hybrid video coding approach in the H.261 standard in 1990, new video coding techniques and tools were developed and formed the basis for new video coding standards. Further video coding standards comprise MPEG-1 video, MPEG-2 video, ITU-T H.262/MPEG-2, ITU-T H.263, ITU-T H.264/MPEG-4, Part 10, Advanced Video Coding (AVC), ITU-T H.265/High Efficiency Video Coding (HEVC), ITU-T H.266/Versatile video coding (VVC) and extensions, e.g. scalability and/or three-dimensional (3D) extensions, of these standards. As the video creation and use have become more and more ubiquitous, video traffic is the biggest load on communication networks and data storage, accordingly, one of the goals of most of the video coding standards was to achieve a bitrate reduction compared to its predecessor without sacrificing picture quality. Even the latest High Efficiency video coding (HEVC) can compress video about twice as much as AVC without sacrificing quality, it is hunger for new technical to further compress video as compared with HEVC.

SUMMARY

Embodiments of the present invention provide apparatuses and methods for encoding and decoding.

According to a first aspect of the disclosure, a method of encoding or decoding the picture is provided. The method comprises, for a current block of the picture, determining whether or not the following condition is satisfied:
the current block is a non-boundary block not located at a boundary of the picture; and
a multi-type tree depth, mttDepth, resulting from multi-type tree splitting of a quadtree leaf, is greater than or equal to a sum of a maximum boundary multi-type partition depth, MaxMttDepth, and an offset, depthOffset, to the MaxMttDepth,
wherein the depthOffset is initialized as 0 and increased by 1 if, in the multi-type splitting of the quadtree leaf, a binary tree split is performed. The method further comprises not applying binary splitting to the current block in response to determining that the condition is satisfied.

In some embodiments, the method comprises applying binary splitting to the current block in response to determining that the current block is a boundary block located at the boundary of the picture irrespective of whether or not mttDepth is greater than or equal to the sum of the MaxMttDepth and the depthOffset.

Accordingly, efficient encoding and decoding of boundary blocks may be facilitated.

In accordance with the first aspect, the disclosure may facilitate flexibly controlling the application of binary splitting, dependent on whether or not a current block is a boundary block.

In some embodiments, the multi-type tree splitting includes at least one of binary splitting and ternary splitting.

For example, the current block is determined not to be a boundary block located at the boundary if and x0+cbWidth is smaller than or equal to a picture width, pic_width_in_luma_samples, of the picture and y0+cbHeight is smaller than or equal to a picture height, pic_height_in_luma_samples, of the picture wherein (x0,y0) is a location of a top-left luma sample of the current block, cbWidth is a width of the current block, and cbHeight is a height of the current block.

In some examples, the method further comprises setting a variable allowBtSplit to FALSE if the condition is satisfied; and applying or not applying binary splitting to the current block based on the variable allowBtSplit.

In some embodiments, the applying or not applying binary splitting to the current block based on the variable allowBtSplit comprises applying binary splitting to the current block when the variable allowBtSplit is equal to TRUE and not applying binary splitting to the current block when the variable allowBtSplit is equal to FALSE.

In some embodiments, the MaxMttDepth is set as 0.

This may facilitate practically turning multi-type tree splitting on or off

For instance, the picture is a frame of a video sequence.

According to a second aspect, an encoder is provided comprising processing circuitry for carrying out the method according to any embodiment of the first aspect.

According to a third aspect, a decoder is provided comprising processing circuitry for carrying out the method according to any embodiment of the first aspect.

According to a fourth aspect, an encoder is provided comprising one or more processors and a non-transitory computer-readable storage medium coupled to the processors and storing a program for execution by the processors, wherein the program, when executed by the processors, configures the encoder to carry out the method according to any embodiment of the first aspect.

According to a fifth aspect, a decoder is provided comprising one or more processors and a non-transitory computer-readable storage medium coupled to the processors and storing program for execution by the processors, wherein the program, when executed by the processors, configures the decoder to carry out the method according to any one of the forgoing aspects of the embodiments.

According to a sixth aspect, an apparatus for encoding or decoding a picture including a current block is provided. The apparatus includes processing circuitry configured to determine whether or not the following condition is satisfied:
the current block is a non-boundary block not located at a boundary of the picture; and
a multi-type tree depth, mttDepth, resulting from multi-type tree splitting of a quadtree leaf, is greater than or equal to a sum of a maximum boundary multi-type partition depth, MaxMttDepth, and an offset, depthOffset, to the MaxMttDepth, wherein the depthOffset is initialized as 0 and increased by 1 if, in the multi-type splitting of the quadtree leaf, a binary tree split is performed. The processing circuitry is further configured not to apply binary splitting to the current block in response to determining that the condition is satisfied.

In accordance with the sixth aspect, the disclosure may facilitate flexibly controlling the application of binary splitting, dependent on whether or not a current block is a boundary block.

For instance, the processing circuitry s configured to apply binary splitting to the current block in response to determining that the current block is a boundary block located at the boundary of the picture irrespective of whether or not mttDepth is greater than or equal to the sum of the MaxMttDepth and the depthOffset.

Accordingly, efficient encoding and decoding of boundary blocks may be facilitated.

In some embodiments, the multi-type tree splitting includes at least one of binary splitting and ternary splitting.

For instance, the processing circuitry is configured to determine that the current block is not a boundary block located at the boundary if and x0+cbWidth is smaller than or equal to a picture width, pic_width_in_luma_samples, of the picture and y0+cbHeight is smaller than or equal to a picture height, pic_height_in_luma_samples, of the picture, wherein (x0,y0) is a location of a top-left luma sample of the current block, cbWidth is a width of the current block, and cbHeight is a height of the current block.

In some embodiments, the processing circuitry (1010, 1020) is configured to set a variable allowBtSplit to FALSE if the condition is satisfied, and to apply or not to apply binary splitting to the current block based on the variable allowBtSplit.

For example, the processing circuitry is configured, in the applying or not applying binary splitting to the current block based on the variable allowBtSplit, to apply binary splitting to the current block when the variable allowBtSplit is equal to TRUE, and not to apply binary splitting to the current block when the variable allowBtSplit is equal to FALSE.

In some embodiments, the MaxMttDepth is set as 0.

This may facilitate practically turning multi-type tree splitting on or off

For instance, the picture is a frame of a video sequence.

According to a seventh aspect, an encoder operable to encode a picture including a current block is provided. The encoder comprises the apparatus according to any embodiment of the sixth aspect.

According to an eighth aspect, a decoder operable to decode a picture including a current block is provided. The decoder comprises the apparatus according to any embodiment of the sixth aspect.

According to a ninth aspect, a computer program product is provided, comprising a program code for performing the method according to any embodiment of the first aspect.

According to a tenth aspect, a computer program is provided. The computer program comprises program code which, when the program is executed on a computer, causes the computer to perform the method according to any embodiment of the first aspect, comprising determining whether or not the following condition is satisfied:

the current block is a non-boundary block not located at a boundary of the picture; and
a multi-type tree depth, mttDepth, resulting from multi-type tree splitting of a quadtree leaf, is greater than or equal to a sum of a maximum boundary multi-type partition depth, MaxMttDepth, and an offset, depthOffset, to the MaxMttDepth, wherein the depthOffset is initialized as 0 and increased by 1 if, in the multi-type splitting of the quadtree leaf, a binary tree split is performed, and not applying binary splitting to the current block in response to determining that the condition is satisfied.

For the purpose of clarity, any one of the embodiments disclosed herein may be combined with any one or more of the other embodiments to form another embodiment within the scope of the present disclosure.

These and other features will be more clearly understood from the following detailed description taken in conjunction with the accompanying drawings and claims.

BRIEF DESCRIPTION OF THE DRAWINGS

In the following embodiments of the invention are described in more detail with reference to the attached figures and drawings, in which.

DETAILED DESCRIPTION OF THE EMBODIMENTS

Figure 1A:
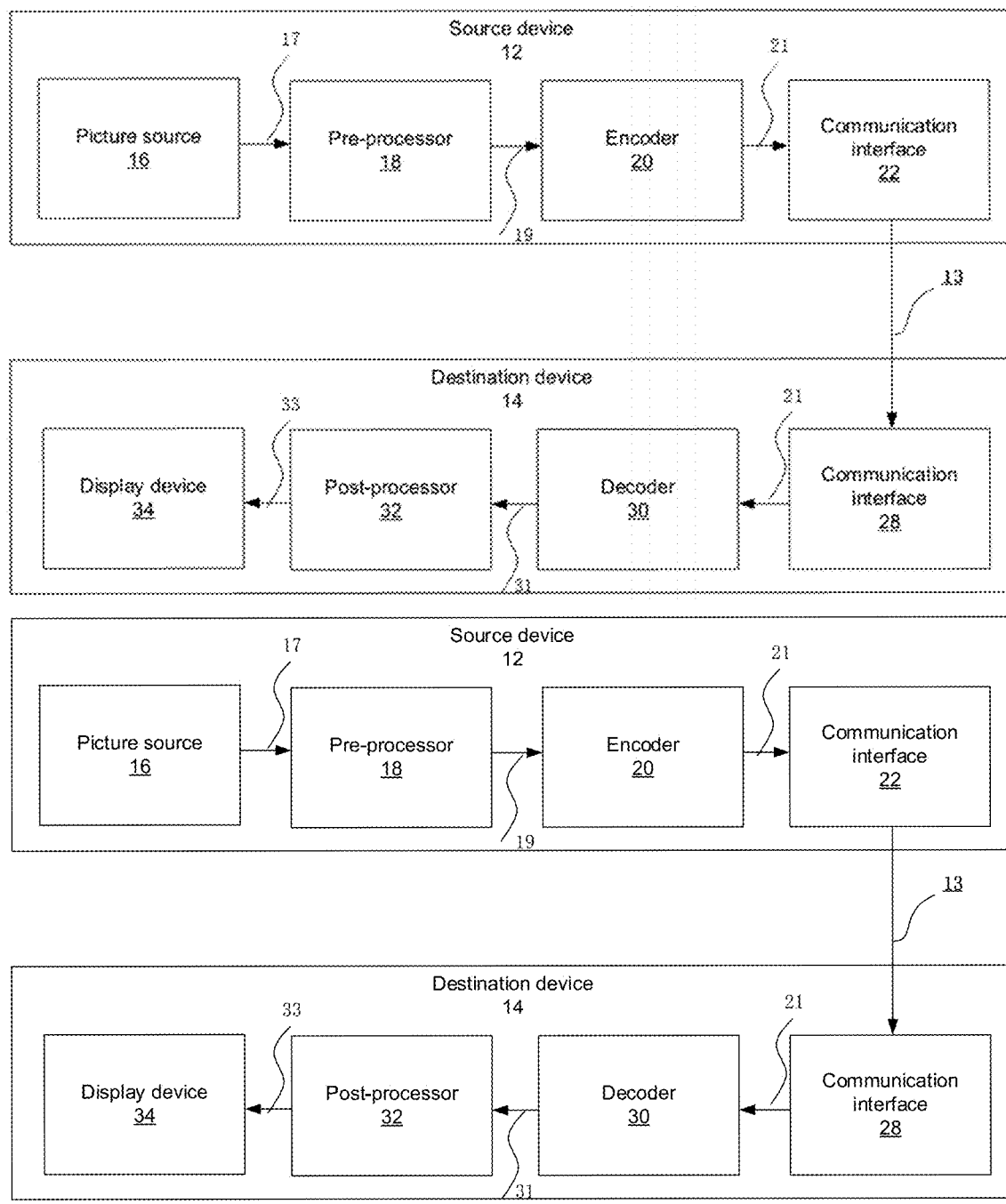
FIG. 1A is a block diagram showing an example of a video coding system configured to implement embodiments of the invention.

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding used in the present application (or present disclosure) indicates either video encoding or video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to either "encoding" or "decoding" for video sequence. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is partially applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

As used herein, the term "block" may a portion of a picture or a frame. For convenience of description, embodiments of the invention are described herein in reference to High-Efficiency Video Coding (HEVC) or the reference software of Versatile video coding (VVC), developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC. For instance, the term "block" may refer to a CU (coding unit), PU (prediction unit), and TU (transform unit). In HEVC, a CTU (coding tree unit) is split into CUs by using a quadtree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. In the newest development of the video compression technical, Quad-tree and binary tree (QTBT) partitioning frame is used to partition a coding block. In the QTBT block structure, a CU can have either a square or rectangular shape. For example, a coding tree unit (CTU) is first partitioned by a quadtree structure. The quadtree leaf nodes are further partitioned by a binary tree structure. The binary tree leaf nodes are called coding units (CUs), and that segmentation is used for prediction and transform processing without any further partitioning. This means that the CU, PU and TU have the same block size in the QTBT coding block structure. In parallel, multiply partition or multi-tree partitioning including, for example, ternary tree partition was also proposed to be used together with the QTBT block structure.

In the following embodiments of an encoder 20, a decoder 30 and a coding system 10 are described based on FIGS. 1 to 3.

FIG. 1A is a conceptional or schematic block diagram illustrating an example coding system 10, e.g. a video coding system 10 that may utilize techniques of this present application (present disclosure). Encoder 20 (e.g. Video encoder 20) and decoder 30 (e.g. video decoder 30) of video coding system 10 represent examples of devices that may be configured to perform techniques in accordance with various examples described in the present application. As shown in FIG. 1A, the coding system 10 comprises a source device 12 configured to provide encoded data 13, e.g. an encoded picture 13, e.g. to a destination device 14 for decoding the encoded data 13.

The source device 12 comprises an encoder 20, and may additionally, i.e. optionally, comprise a picture source 16, a pre-processing unit 18, e.g. a picture pre-processing unit 18, and a communication interface or communication unit 22.

The picture source 16 may comprise or be any kind of picture capturing device, for example for capturing a real-world picture, and/or any kind of a picture or comment (for screen content coding, some texts on the screen is also considered a part of a picture or image to be encoded) generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g. an augmented reality (AR) picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In an RBG format or color space a picture comprises a corresponding red, green and blue sample array. However, in video coding each pixel is typically represented in a luminance/chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 16 (e.g. video source 16) may be, for example a camera for capturing a picture, a memory, e.g. a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 17 may be the same interface as or a part of the communication interface 22.

In distinction to the pre-processing unit 18 and the processing performed by the pre-processing unit 18, the picture or picture data 17 (e.g. video data 17) may also be referred to as raw picture or raw picture data 17.

Pre-processing unit 18 is configured to receive the (raw) picture data 17 and to perform pre-processing on the picture data 17 to obtain a pre-processed picture 19 or pre-processed picture data 19. Pre-processing performed by the pre-processing unit 18 may, e.g., comprise trimming, color format conversion (e.g. from RGB to YCbCr), color correction, or de-noising. It can be understood that the pre-processing unit 18 may be optional component.

The encoder 20 (e.g. video encoder 20) is configured to receive the pre-processed picture data 19 and provide encoded picture data 21 (further details will be described below, e.g., based on FIG. 2 or FIG. 4).

Communication interface 22 of the source device 12 may be configured to receive the encoded picture data 21 and to transmit it to another device, e.g. the destination device 14 or any other device, for storage or direct reconstruction, or to process the encoded picture data 21 for respectively before storing the encoded data 13 and/or transmitting the encoded data 13 to another device, e.g. the destination device 14 or any other device for decoding or storing.

The destination device 14 comprises a decoder 30 (e.g. a video decoder 30), and may additionally, i.e. optionally, comprise a communication interface or communication unit 28, a post-processing unit 32 and a display device 34.

The communication interface 28 of the destination device 14 is configured receive the encoded picture data 21 or the encoded data 13, e.g. directly from the source device 12 or from any other source, e.g. a storage device, e.g. an encoded picture data storage device.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, for transmission over a communication link or communication network.

The communication interface 28, forming the counterpart of the communication interface 22, may be, e.g., configured to de-package the encoded data 13 to obtain the encoded picture data 21.

Both, communication interface 22 and communication interface 28 may be configured as unidirectional communication interfaces as indicated by the arrow for the encoded picture data 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

The encoder 20 (e.g. a video encoder 20) and the decoder 30 (e.g. a video decoder 30) each may be implemented as any of a variety of suitable circuitry (e.g. processing circuitry), such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

Source device 12 may be referred to as a video encoding device or a video encoding apparatus. Destination device 14 may be referred to as a video decoding device or a video decoding apparatus. Source device 12 and destination device 14 may be examples of video coding devices or video coding apparatuses.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system.

In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

It should be understood that, for each of the above examples described with reference to video encoder 20, video decoder 30 may be configured to perform a reciprocal process. With regard to signaling syntax elements, video decoder 30 may be configured to receive and parse such syntax element and decode the associated video data accordingly. In some examples, video encoder 20 may entropy encode one or more syntax elements into the encoded video bitstream. In such examples, video decoder 30 may parse such syntax element and decode the associated video data accordingly.

Figure 1B:
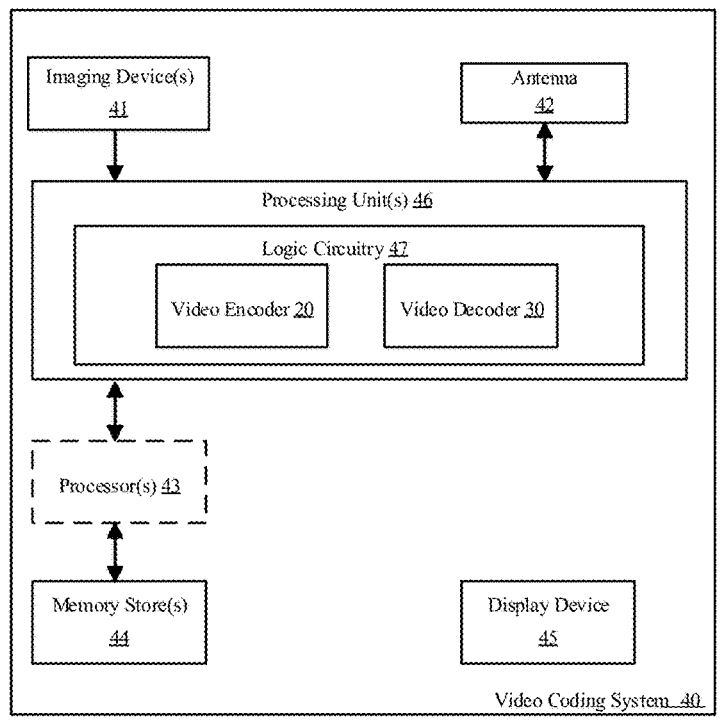
FIG. 1B is a block diagram showing another example of a video coding system configured to implement embodiments of the invention.
Figure 2:
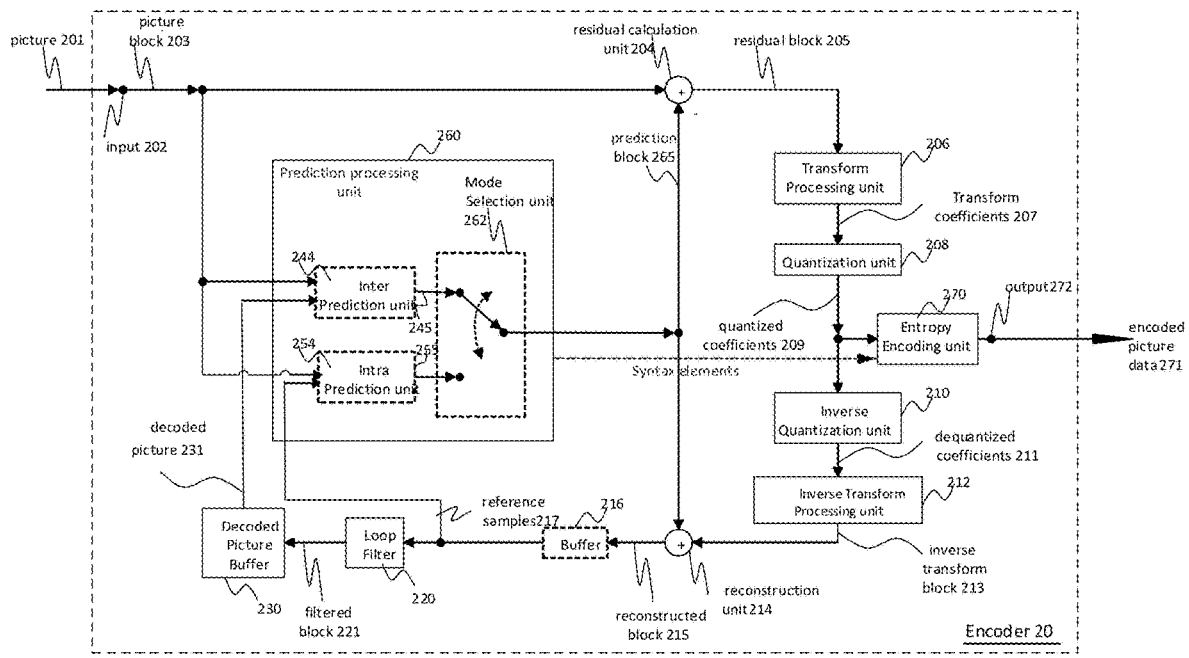
FIG. 2 is a block diagram showing an example of a video encoder configured to implement embodiments of the invention.
Figure 3:
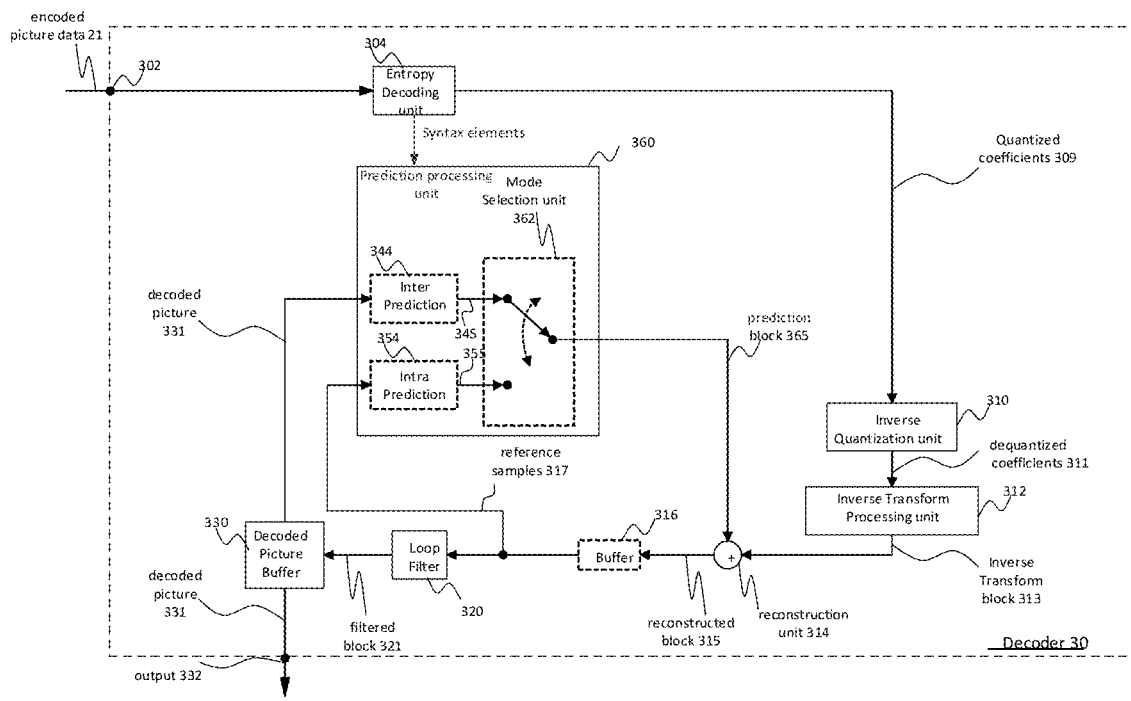
FIG. 3 is a block diagram showing an example structure of a video decoder configured to implement embodiments of the invention.

FIG. 1B is an illustrative diagram of another example video coding system 40 including encoder 20 of FIG. 2 and/or decoder 30 of FIG. 3 according to an exemplary embodiment. The system 40 can implement techniques in accordance with various examples described in the present application. In the illustrated implementation, video coding system 40 may include imaging device(s) 41, video encoder 20, video decoder 30 (and/or a video coder implemented via logic circuitry 47 of processing unit(s) 46), an antenna 42, one or more processor(s) 43, one or more memory store(s) 44, and/or a display device 45.

As illustrated, imaging device(s) 41, antenna 42, processing unit(s) 46, logic circuitry 47, video encoder 20, video decoder 30, processor(s) 43, memory store(s) 44, and/or display device 45 may be capable of communication with one another. As discussed, although illustrated with both video encoder 20 and video decoder 30, video coding system 40 may include only video encoder 20 or only video decoder 30 in various examples.

As shown, in some examples, video coding system 40 may include antenna 42. Antenna 42 may be configured to transmit or receive an encoded bitstream of video data, for example. Further, in some examples, video coding system 40 may include display device 45. Display device 45 may be configured to present video data. As shown, in some examples, logic circuitry 47 may be implemented via processing unit(s) 46. Processing unit(s) 46 may include application-specific integrated circuit (ASIC) logic, graphics processor(s), general purpose processor(s), or the like. Video coding system 40 also may include optional processor(s) 43, which may similarly include application-specific integrated circuit (ASIC) logic, graphics processor(s), general purpose processor(s), or the like. In some examples, logic circuitry 47 may be implemented via hardware, video coding dedicated hardware, or the like, and processor(s) 43 may implemented general purpose software, operating systems, or the like. In addition, memory store(s) 44 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 44 may be implemented by cache memory. In some examples, logic circuitry 47 may access memory store(s) 44 (for implementation of an image buffer for example). In other examples, logic circuitry 47 and/or processing unit(s) 46 may include memory stores (e.g., cache or the like) for the implementation of an image buffer or the like.

In some examples, video encoder 20 implemented via logic circuitry may include an image buffer (e.g., via either processing unit(s) 46 or memory store(s) 44)) and a graphics processing unit (e.g., via processing unit(s) 46). The graphics processing unit may be communicatively coupled to the image buffer. The graphics processing unit may include video encoder 20 as implemented via logic circuitry 47 to embody the various modules as discussed with respect to FIG. 2 and/or any other encoder system or subsystem described herein. The logic circuitry may be configured to perform the various operations as discussed herein.

Video decoder 30 may be implemented in a similar manner as implemented via logic circuitry 47 to embody the various modules as discussed with respect to decoder 30 of FIG. 3 and/or any other decoder system or subsystem described herein. In some examples, video decoder 30 may be implemented via logic circuitry may include an image buffer (e.g., via either processing unit(s) 420 or memory store(s) 44)) and a graphics processing unit (e.g., via processing unit(s) 46). The graphics processing unit may be communicatively coupled to the image buffer. The graphics processing unit may include video decoder 30 as implemented via logic circuitry 47 to embody the various modules as discussed with respect to FIG. 3 and/or any other decoder system or subsystem described herein.

In some examples, antenna 42 of video coding system 40 may be configured to receive an encoded bitstream of video data. As discussed, the encoded bitstream may include data, indicators, index values, mode selection data, or the like associated with encoding a video frame as discussed herein, such as data associated with the coding partition (e.g., transform coefficients or quantized transform coefficients, optional indicators (as discussed), and/or data defining the coding partition). Video coding system 40 may also include video decoder 30 coupled to antenna 42 and configured to decode the encoded bitstream. The display device 45 configured to present video frames.

FIG. 2 shows a schematic/conceptual block diagram of an example video encoder 20 that is configured to implement the techniques of the present application. In the example of FIG. 2, the video encoder 20 comprises a residual calculation unit 204, a transform processing unit 206, a quantization unit 208, an inverse quantization unit 210, and inverse transform processing unit 212, a reconstruction unit 214, a buffer 216, a loop filter unit 220, a decoded picture buffer (DPB) 230, a prediction processing unit 260 and an entropy encoding unit 270. The prediction processing unit 260 may include an inter prediction unit 244, an intra prediction unit 254 and a mode selection unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

For example, the residual calculation unit 204, the transform processing unit 206, the quantization unit 208, the prediction processing unit 260 and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, prediction processing unit 260 form a backward signal path of the encoder, wherein the backward signal path of the encoder corresponds to the signal path of the decoder (see decoder 30 in FIG. 3).

The encoder 20 is configured to receive, e.g. by input 202, a picture 201 or a block 203 of the picture 201, e.g. picture of a sequence of pictures forming a video or video sequence. The picture block 203 may also be referred to as current picture block or picture block to be coded, and the picture 201 as current picture or picture to be coded (in particular in video coding to distinguish the current picture from other pictures, e.g. previously encoded and/or decoded pictures of the same video sequence, i.e. the video sequence which also comprises the current picture).

Partitioning

Embodiments of the encoder 20 may comprise a partitioning unit (not depicted in FIG. 2) configured to partition the picture 201 into a plurality of blocks, e.g. blocks like block 203, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks.

In one example, the prediction processing unit 260 of video encoder 20 may be configured to perform any combination of the partitioning techniques described above.

Like the picture 201, the block 203 again is or can be regarded as a two-dimensional array or matrix of samples with intensity values (sample values), although of smaller dimension than the picture 201. In other words, the block 203 may comprise, e.g., one sample array (e.g. a luma array in case of a monochrome picture 201) or three sample arrays (e.g. a luma and two chroma arrays in case of a color picture 201) or any other number and/or kind of arrays depending on the color format applied. The number of samples in horizontal and vertical direction (or axis) of the block 203 define the size of block 203.

Encoder 20 as shown in FIG. 2 is configured to encode the picture 201 block by block, e.g. the encoding and prediction is performed per block 203.

Residual Calculation

The residual calculation unit 204 is configured to calculate a residual block 205 based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 is configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for HEVC/H.265. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transform coefficients, tradeoff between accuracy and implementation costs, etc. Specific scaling factors are, for example, specified for the inverse transform, e.g. by inverse transform processing unit 212, at a decoder 30 (and the corresponding inverse transform, e.g. by inverse transform processing unit 212 at an encoder 20) and corresponding scaling factors for the forward transform, e.g. by transform processing unit 206, at an encoder 20 may be specified accordingly.

Quantization

The quantization unit 208 is configured to quantize the transform coefficients 207 to obtain quantized transform coefficients 209, e.g. by applying scalar quantization or vector quantization. The quantized transform coefficients 209 may also be referred to as quantized residual coefficients 209. The quantization process may reduce the bit depth associated with some or all of the transform coefficients 207. For example, an n-bit Transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes.

For example, small quantization parameters may correspond to fine quantization (small quantization step sizes) and large quantization parameters may correspond to coarse quantization (large quantization step sizes) or vice versa. The quantization may include division by a quantization step size and corresponding or inverse dequantization, e.g. by inverse quantization 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

The inverse transform processing unit 212 is configured to apply the inverse transform of the transform applied by the transform processing unit 206, e.g. an inverse discrete cosine transform (DCT) or inverse discrete sine transform (DST), to obtain an inverse transform block 213 in the sample domain. The inverse transform block 213 may also be referred to as inverse transform dequantized block 213 or inverse transform residual block 213.

The reconstruction unit 214 (e.g. Summer 214) is configured to add the inverse transform block 213 (i.e. reconstructed residual block 213) to the prediction block 265 to obtain a reconstructed block 215 in the sample domain, e.g. by adding the sample values of the reconstructed residual block 213 and the sample values of the prediction block 265.

In an embodiment, the buffer unit 216 (or short "buffer" 216), e.g. a line buffer 216, is configured to buffer or store the reconstructed block 215 and the respective sample values, for example for intra prediction. In further embodiments, the encoder may be configured to use unfiltered reconstructed blocks and/or the respective sample values stored in buffer unit 216 for any kind of estimation and/or prediction, e.g. intra prediction.

Embodiments of the encoder 20 may be configured such that, e.g. the buffer unit 216 is not only used for storing the reconstructed blocks 215 for intra prediction 254 but also for the loop filter unit or loop filter 220, and/or such that, e.g. the buffer unit 216 and the decoded picture buffer (DPB) unit 230 form one buffer. Further embodiments may be configured to use filtered blocks 221 and/or blocks or samples from the decoded picture buffer 230 as input or basis for intra prediction 254.

The loop filter unit 220 (or short "loop filter" 220), is configured to filter the reconstructed block 215 to obtain a filtered block 221, e.g. to smooth pixel transitions, or otherwise improve the video quality. The loop filter unit 220 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 220 is shown in FIG. 2 as being an in loop filter, in other configurations, the loop filter unit 220 may be implemented as a post loop filter. The filtered block 221 may also be referred to as filtered reconstructed block 221. Decoded picture buffer 230 may store the reconstructed coding blocks after the loop filter unit 220 performs the filtering operations on the reconstructed coding blocks.

Embodiments of the encoder 20 (respectively loop filter unit 220) may be configured to output loop filter parameters (such as sample adaptive offset information), e.g. directly or entropy encoded via the entropy encoding unit 270 or any other entropy coding unit, so that, e.g., a decoder 30 may receive and apply the same loop filter parameters for decoding.

The decoded picture buffer (DPB) 230 may be a reference picture memory that stores reference picture data for use in encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The DPB 230 and the buffer 216 may be provided by the same memory device or separate memory devices. In some example, the decoded picture buffer (DPB) 230 is configured to store the filtered block 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. In some example, if the reconstructed block 215 is reconstructed but without in-loop filtering, the decoded picture buffer (DPB) 230 is configured to store the reconstructed block 215.

The prediction processing unit 260, also referred to as block prediction processing unit 260, is configured to receive or obtain the block 203 (current block 203 of the current picture 201) and reconstructed picture data, e.g.

reference samples of the same (current) picture from buffer 216 and/or reference picture data 231 from one or a plurality of previously decoded pictures from decoded picture buffer 230, and to process such data for prediction, i.e. to provide a prediction block 265, which may be an inter-predicted block 245 or an intra-predicted block 255.

Mode selection unit 262 may be configured to select a prediction mode (e.g. an intra or inter prediction mode) and/or a corresponding prediction block 245 or 255 to be used as prediction block 265 for the calculation of the residual block 205 and for the reconstruction of the reconstructed block 215.

Embodiments of the mode selection unit 262 may be configured to select the prediction mode (e.g. from those supported by prediction processing unit 260), which provides the best match or in other words the minimum residual (minimum residual means better compression for transmission or storage), or a minimum signaling overhead (minimum signaling overhead means better compression for transmission or storage), or which considers or balances both. The mode selection unit 262 may be configured to determine the prediction mode based on rate distortion optimization (RDO), i.e. select the prediction mode which provides a minimum rate distortion optimization or which associated rate distortion at least a fulfills a prediction mode selection criterion.

In the following the prediction processing (e.g. prediction processing unit 260 and mode selection (e.g. by mode selection unit 262) performed by an example encoder 20 will be explained in more detail.

As described above, the encoder 20 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 35 different intra-prediction modes, e.g. non-directional modes like DC (or mean) mode and planar mode, or directional modes, e.g. as defined in H.265, or may comprise 67 different intra-prediction modes, e.g. non-directional modes like DC (or mean) mode and planar mode, or directional modes, e.g. as defined in H.266 under developing. However, the present disclosure is not limited to a particular number of intra-prediction modes, which may also be greater or smaller than 35 or 67.

The set of (or possible) inter-prediction modes depend on the available reference pictures (i.e. previous at least partially decoded pictures, e.g. stored in DPB 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The prediction processing unit 260 may be further configured to partition the block 203 into smaller block partitions or sub-blocks, e.g. iteratively using quadtree-partitioning (QT), binary partitioning (BT) or ternary-tree-partitioning (TT) or any combination thereof, and to perform, e.g. the prediction for each of the block partitions or sub-blocks, wherein the mode selection comprises the selection of the tree-structure of the partitioned block 203 and the prediction modes applied to each of the block partitions or sub-blocks.

The inter prediction unit 244 may include motion estimation (ME) unit (not shown in FIG. 2) and motion compensation (MC) unit (not shown in FIG. 2). The motion estimation unit is configured to receive or obtain the picture block 203 (current picture block 203 of the current picture 201) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter prediction parameters to the motion estimation unit (not shown in FIG. 2). This offset is also called motion vector (MV).

The motion compensation unit is configured to obtain, e.g. receive, an inter prediction parameter and to perform inter prediction based on or using the inter prediction parameter to obtain an inter prediction block 245. Motion compensation, performed by motion compensation unit (not shown in FIG. 2), may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit 246 may locate the prediction block to which the motion vector points in one of the reference picture lists. Motion compensation unit 246 may also generate syntax elements associated with the blocks and the video slice for use by video decoder 30 in decoding the picture blocks of the video slice. A video slice or slice is a partition of a video picture which is coded without dependency on data from other slices of the same picture.

The intra prediction unit 254 is configured to obtain, e.g. receive, the picture block 203 (current picture block) and one or a plurality of previously reconstructed blocks, e.g. reconstructed neighbor blocks, of the same picture for intra estimation. The encoder 20 may, e.g., be configured to select an intra prediction mode from a plurality of (predetermined) intra prediction modes.

Embodiments of the encoder 20 may be configured to select the intra-prediction mode based on an optimization criterion, e.g. minimum residual (e.g. the intra-prediction mode providing the prediction block 255 most similar to the current picture block 203) or minimum rate distortion.

The intra prediction unit 254 is further configured to determine based on intra prediction parameter, e.g. the selected intra prediction mode, the intra prediction block 255. In any case, after selecting an intra prediction mode for a block, the intra prediction unit 254 is also configured to provide intra prediction parameter, i.e. information indicative of the selected intra prediction mode for the block to the entropy encoding unit 270. In one example, the intra prediction unit 254 may be configured to perform any combination of the intra prediction techniques described later.

The entropy encoding unit 270 is configured to apply an entropy encoding algorithm or scheme (e.g. a variable length coding (VLC) scheme, an context adaptive VLC scheme (CALVC), an arithmetic coding scheme, a context adaptive binary arithmetic coding (CABAC), syntax-based context-adaptive binary arithmetic coding (SBAC), probability interval partitioning entropy (PIPE) coding or another entropy encoding methodology or technique) on the quantized residual coefficients 209, inter prediction parameters, intra prediction parameter, and/or loop filter parameters, individually or jointly (or not at all) to obtain encoded picture data 21 which can be output by the output 272, e.g. in the form of an encoded bitstream 21. The encoded bitstream 21 may be transmitted to video decoder 30, or archived for later transmission or retrieval by video decoder 30. The entropy encoding unit 270 can be further configured to entropy encode the other syntax elements for the current video slice being coded.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

FIG. 3 shows an exemplary video decoder 30 that is configured to implement the techniques of this present application. The video decoder 30 configured to receive encoded picture data (e.g. encoded bitstream) 21, e.g. encoded by encoder, to obtain a decoded picture 331. During the decoding process, video decoder 30 receives video data, e.g. an encoded video bitstream that represents picture blocks of an encoded video slice and associated syntax elements, from video encoder 20.

In the example of FIG. 3, the decoder 30 comprises an entropy decoding unit 304, an inverse quantization unit 310, an inverse transform processing unit 312, a reconstruction unit 314 (e.g. a summer 314), a buffer 316, a loop filter 320, a decoded picture buffer 330 and a prediction processing unit 360. The prediction processing unit 360 may include an inter prediction unit 344, an intra prediction unit 354, and a mode selection unit 362. Video decoder 30 may, in some examples, perform a decoding pass generally reciprocal to the encoding pass described with respect to video encoder 20 from FIG. 2.

The entropy decoding unit 304 is configured to perform entropy decoding to the encoded picture data 21 to obtain, e.g., quantized coefficients 309 and/or decoded coding parameters (not shown in FIG. 3), e.g. (decoded) any or all of inter prediction parameters, intra prediction parameter, loop filter parameters, and/or other syntax elements. Entropy decoding unit 304 is further configured to forward inter prediction parameters, intra prediction parameter and/or other syntax elements to the prediction processing unit 360. Video decoder 30 may receive the syntax elements at the video slice level and/or the video block level.

The inverse quantization unit 310 may be identical in function to the inverse quantization unit 110, the inverse transform processing unit 312 may be identical in function to the inverse transform processing unit 212, the reconstruction unit 314 may be identical in function reconstruction unit 214, the buffer 316 may be identical in function to the buffer 216, the loop filter 320 may be identical in function to the loop filter 220, and the decoded picture buffer 330 may be identical in function to the decoded picture buffer 230.

Embodiments of the decoder 30 may comprise a partitioning unit (not depicted in FIG. 3). In one example, the prediction processing unit 360 of video decoder 30 may be configured to perform any combination of the partitioning techniques described above.

The prediction processing unit 360 may comprise an inter prediction unit 344 and an intra prediction unit 354, wherein the inter prediction unit 344 may resemble the inter prediction unit 244 in function, and the intra prediction unit 354 may resemble the intra prediction unit 254 in function. The prediction processing unit 360 are typically configured to perform the block prediction and/or obtain the prediction block 365 from the encoded data 21 and to receive or obtain (explicitly or implicitly) the prediction related parameters and/or the information about the selected prediction mode, e.g. from the entropy decoding unit 304.

When the video slice is coded as an intra coded (I) slice, intra prediction unit 354 of prediction processing unit 360 is configured to generate prediction block 365 for a picture block of the current video slice based on a signaled intra prediction mode and data from previously decoded blocks of the current frame or picture. When the video frame is coded as an inter coded (i.e., B (bi-directional coded), or P (predictive coded)) slice, inter prediction unit 344 (e.g. motion compensation unit) of prediction processing unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Prediction processing unit 360 is configured to determine prediction information for a video block of the current video slice by parsing the motion vectors and other syntax elements, and uses the prediction information to produce the prediction blocks for the current video block being decoded. For example, the prediction processing unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Inverse quantization unit 310 is configured to inverse quantize, i.e., de-quantize, the quantized transform coefficients provided in the bitstream and decoded by entropy decoding unit 304. The inverse quantization process may include use of a quantization parameter calculated by video encoder 20 for each video block in the video slice to determine a degree of quantization and, likewise, a degree of inverse quantization that should be applied.

Inverse transform processing unit 312 is configured to apply an inverse transform, e.g., an inverse DCT, an inverse integer transform, or a conceptually similar inverse transform process, to the transform coefficients in order to produce residual blocks in the pixel domain.

The reconstruction unit 314 (e.g. Summer 314) is configured to add the inverse transform block 313 (i.e. reconstructed residual block 313) to the prediction block 365 to obtain a reconstructed block 315 in the sample domain, e.g. by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g. to smooth pixel transitions, or otherwise improve the video quality. In one example, the loop filter unit 320 may be configured to perform any combination of the filtering techniques described later. The loop filter unit 320 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 320 is shown in FIG. 3 as being an in loop filter, in other configurations, the loop filter unit 320 may be implemented as a post loop filter.

The decoded video blocks 321 in a given frame or picture are then stored in decoded picture buffer 330, which stores reference pictures used for subsequent motion compensation.

The decoder 30 is configured to output the decoded picture 331, e.g. via output 332, for presentation or viewing to a user.

Other variations of the video decoder 30 can be used to decode the compressed bitstream. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

Figure 4:
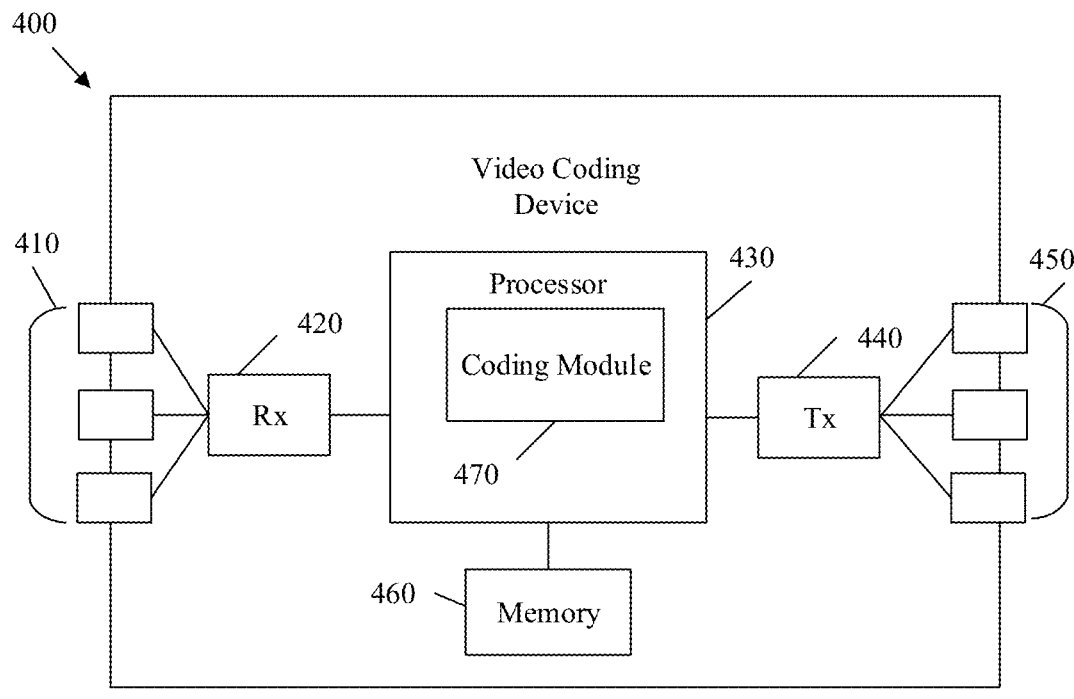
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A. In an embodiment, the video coding device 400 may be one or more components of the video decoder 30 of FIG. 1A or the video encoder 20 of FIG. 1A as described above.

The video coding device 400 comprises ingress ports 410 and receiver units (Rx) 420 for receiving data; a processor, logic unit, or central processing unit (CPU) 430 to process the data; transmitter units (Tx) 440 and egress ports 450 for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 comprises one or more disks, tape drives, and solid-state drives and may be used as an overflow data storage device, to store programs when such programs are selected for execution, and to store instructions and data that are read during program execution. The memory 460 may be volatile and/or non-volatile and may be read-only memory (ROM), random access memory (RAM), ternary content-addressable memory (TCAM), and/or static random-access memory (SRAM).

Figure 5:
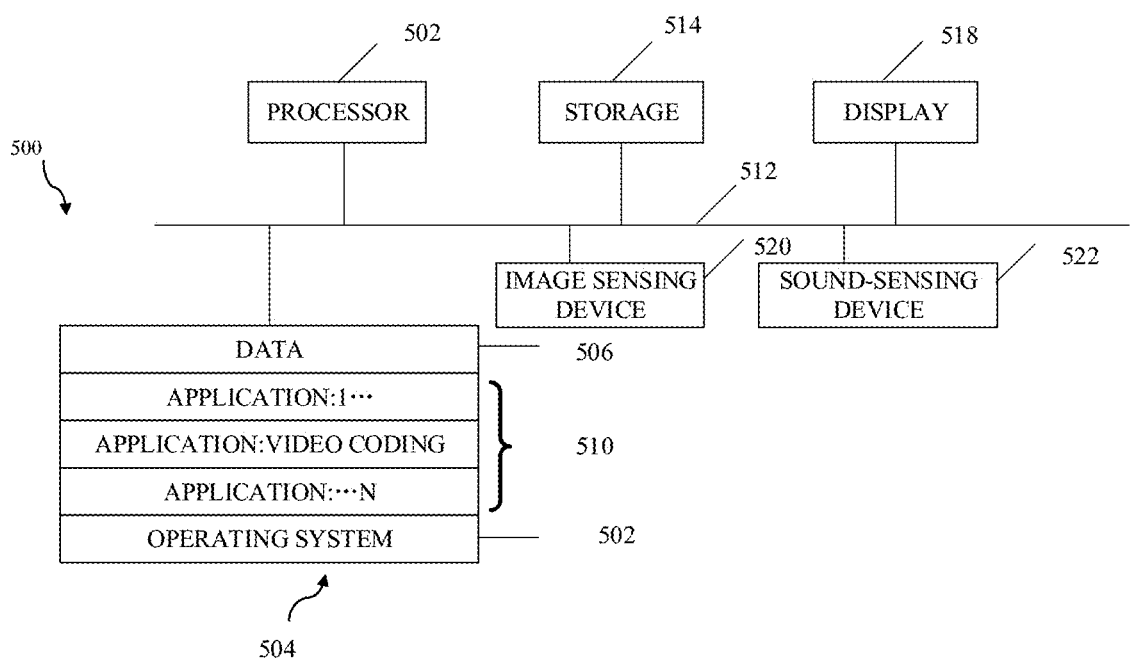
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment. The apparatus 500 can implement techniques of this present application described above. The apparatus 500 can be in the form of a computing system including multiple computing devices, or in the form of a single computing device, for example, a mobile phone, a tablet computer, a laptop computer, a notebook computer, a desktop computer, and the like.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here. The apparatus 500 can also include additional memory in the form of a secondary storage 514, which can, for example, be a memory card used with a mobile computing device. Because the video communication sessions may contain a significant amount of information, they can be stored in whole or in part in the secondary storage 514 and loaded into the memory 504 as needed for processing.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512. Other output devices that permit a user to program or otherwise use the apparatus 500 can be provided in addition to or as an alternative to the display 518. When the output device is or includes a display, the display can be implemented in various ways, including by a liquid crystal display (LCD), a cathode-ray tube (CRT) display, a plasma display or light emitting diode (LED) display, such as an organic LED (OLED) display.

The apparatus 500 can also include or be in communication with an image-sensing device 520, for example a camera, or any other image-sensing device 520 now existing or hereafter developed that can sense an image such as the image of a user operating the apparatus 500. The image-sensing device 520 can be positioned such that it is directed toward the user operating the apparatus 500. In an example, the position and optical axis of the image-sensing device 520 can be configured such that the field of vision includes an area that is directly adjacent to the display 518 and from which the display 518 is visible.

The apparatus 500 can also include or be in communication with a sound-sensing device 522, for example a microphone, or any other sound-sensing device now existing or hereafter developed that can sense sounds near the apparatus 500. The sound-sensing device 522 can be positioned such that it is directed toward the user operating the apparatus 500 and can be configured to receive sounds, for example, speech or other utterances, made by the user while the user operates the apparatus 500.

Although FIG. 5 depicts the processor 502 and the memory 504 of the apparatus 500 as being integrated into a single unit, other configurations can be utilized. The operations of the processor 502 can be distributed across multiple machines (each machine having one or more of processors) that can be coupled directly or across a local area or other network. The memory 504 can be distributed across multiple machines such as a network-based memory or memory in multiple machines performing the operations of the apparatus 500. Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Next Generation Video Coding (NGVC) removes the separation of the CU, PU and TU concepts, and supports more flexibility for CU partition shapes. A size of the CU corresponds to a size of the coding node and may be square or non-square (e.g., rectangular) in shape.

In J. An et al., "Block partitioning structure for next generation video coding", International Telecommunication Union, COM16-C966, September 2015 (hereinafter, "VCEG proposal COM16-C966"), quadtree-binary-tree (QTBT) partitioning techniques were proposed for future video coding standard beyond HEVC. Simulations have shown that the proposed QTBT structure is more efficient than the quadtree structure in used HEVC. In HEVC, inter prediction for small blocks is restricted to reduce the memory access of motion compensation, and inter prediction is not supported for 4×4 blocks. In the QTBT of the JEM, these restrictions are removed.

Figure 6:
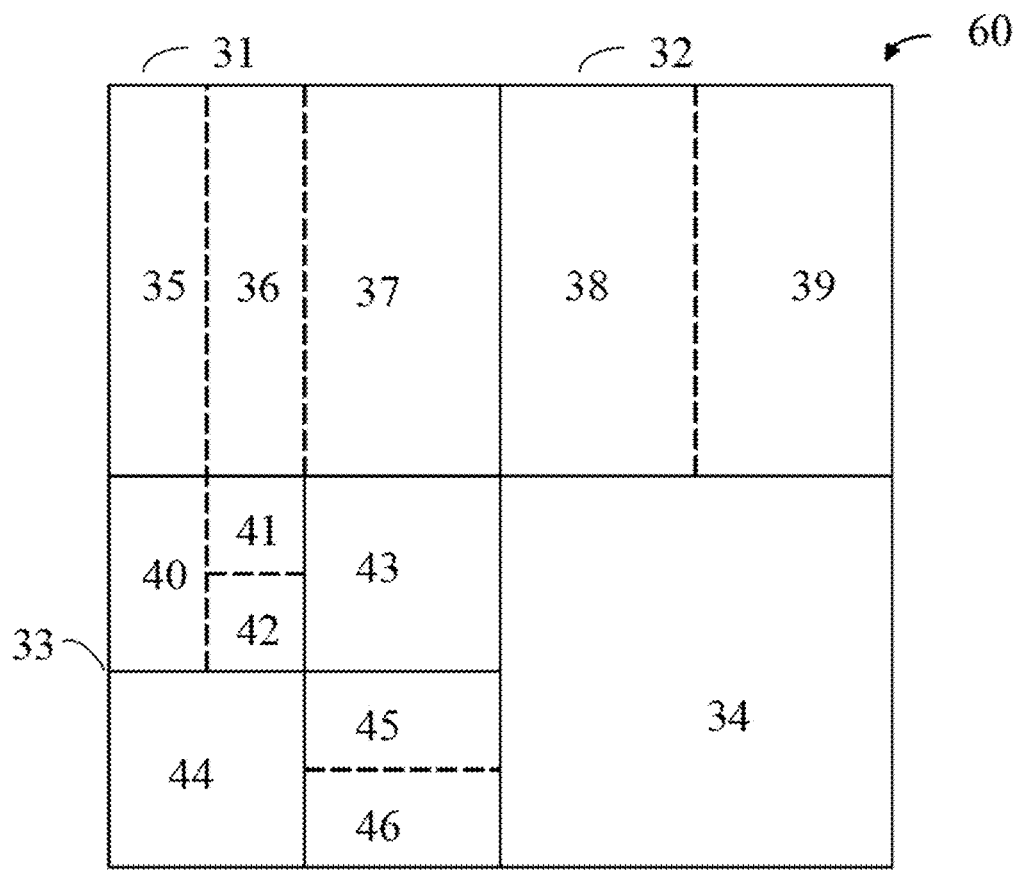
FIG. 6 is an illustrative diagram of an example of block partitioning using a quadtree-binary-tree (QTBT) structure.

In the QTBT, a CU can have either a square or rectangular shape. As shown in FIG. 6, a coding tree unit (CTU) is first partitioned by a quadtree structure. The quadtree leaf nodes can be further partitioned by a quadtree or binary tree structure. There are two splitting types, symmetric horizontal splitting and symmetric vertical splitting, in the binary tree splitting. In each case, a node is split by dividing the node down the middle, either horizontally or vertically. The binary tree leaf nodes are called coding units (CUs), and that segmentation is used for prediction and transform processing without any further partitioning. This means that the CU, PU and TU have the same block size in the QTBT coding block structure. A CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme.
CTU size: the root node size of a quadtree, the same concept as in HEVC
MinQTSize: the minimum allowed quadtree leaf node size
MaxBTSize: the maximum allowed binary tree root node size
MaxBTDepth: the maximum allowed binary tree depth
MinBTSize: the minimum allowed binary tree leaf node size In one embodiment of the QTBT partitioning structure, when the quadtree node has size equal to or smaller than MinQTSize, no further quadtree is considered. It will not be further split by the binary tree since the size exceeds the MaxBTSize. Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples. The leaf nodes of the binary-tree (CUs) may be further processed (e.g., by performing a prediction process and a transform process) without any further partitioning.

Figure 7:
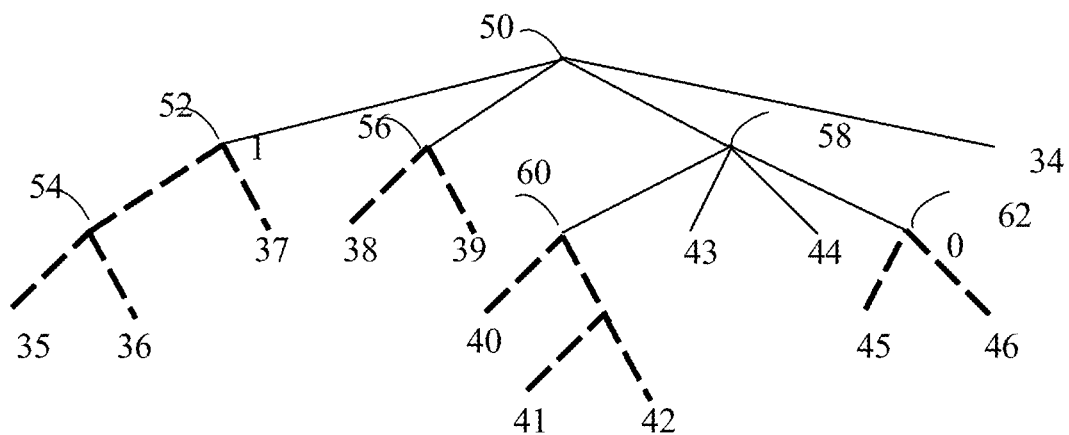
FIG. 7 is an illustrative diagram of an example of tree structure corresponding to the block partitioning using the QTBT structure of FIG. 6.

FIG. 6 illustrates an example of a block 60 (e.g., a CTB) partitioned using QTBT partitioning techniques. As shown in FIG. 6, using QTBT partition techniques, each of the blocks is split symmetrically through the center of each block. FIG. 7 illustrates the tree structure corresponding to the block partitioning of FIG. 6. The solid lines in FIG. 7 indicate quadtree splitting and dotted lines indicate binary-tree splitting. In one example, in each splitting (i.e., non-leaf) node of the binary-tree, a syntax element (e.g., a flag) is signaled to indicate the type of splitting performed (e.g., horizontal or vertical), where 0 indicates horizontal splitting and 1 indicates vertical splitting. For the quadtree splitting, there is no need to indicate the splitting type, as quadtree splitting always splits a block horizontally and vertically into 4 sub-blocks with an equal size.

As shown in FIG. 7, at node 50, block 60 is split into the four blocks 31, 32, 33, and 34, shown in FIG. 6, using QT partitioning. Block 34 is not further split, and is therefore a leaf node. At node 52, block 31 is further split into two blocks using BT partitioning. As shown in FIG. 7, node 52 is marked with a 1, indicating vertical splitting. As such, the splitting at node 52 results in block 37 and the block including both blocks 35 and 36. Blocks 35 and 36 are created by a further vertical splitting at node 54. At node 56, block 32 is further split into two blocks 38 and 39 using BT partitioning.

At node 58, block 33 is split into 4 equal size blocks using QT partitioning. Blocks 43 and 44 are created from this QT partitioning and are not further split. At node 60, the upper left block is first split using vertical binary-tree splitting resulting in block 40 and a right vertical block. The right vertical block is then split using horizontal binary-tree splitting into blocks 41 and 42. The lower right block created from the quadtree splitting at node 58, is split at node 62 using horizontal binary-tree splitting into blocks 45 and 46. As shown in FIG. 7, node 62 is marked with a 0, indicating horizontal splitting.

In addition to QTBT, a block partitioning structure named multi-type-tree (MTT) is proposed to replace BT in QTBT based CU structures, that means a CTU may be split by QT partitioning firstly to obtain a block of the CTU, and then the block may be split by MTT partitioning secondly.

The MTT partitioning structure is still a recursive tree structure. In MTT, multiple different partition structures (e.g., two or more) are used. For example, according to the MTT techniques, two or more different partition structures may be used for each respective non-leaf node of a tree structure, at each depth of the tree structure. The depth of a node in a tree structure may refer to the length of the path (e.g., the number of splits) from the node to the root of the tree structure.

In MTT, there are two partition types, BT partitioning and ternary-tree (TT) partitioning. Partition type can be selected from BT partitioning and TT partitioning. The TT partition structure differs from that of the QT or BT structures, in that the TT partition structure does not split a block down the center. The center region of the block remains together in the same sub-block. Different from QT, which produces four blocks, or binary tree, which produces two blocks, splitting according to a TT partition structure produces three blocks. Example partition types according to the TT partition structure include symmetric partition types (both horizontal and vertical), as well as asymmetric partition types (both horizontal and vertical). Furthermore, the symmetric partition types according to the TT partition structure may be uneven/non-uniform or even/uniform. The asymmetric partition types according to the TT partition structure are uneven/non-uniform. In one example, a TT partition structure may include at least one of the following partition types: horizontal even/uniform symmetric ternary-tree, vertical even/uniform symmetric ternary-tree, horizontal uneven/non-uniform symmetric ternary-tree, vertical uneven/non-uniform symmetric ternary-tree, horizontal uneven/non-uniform asymmetric ternary-tree, or vertical uneven/non-uniform asymmetric ternary-tree partition types.

In general, an uneven/non-uniform symmetric ternary-tree partition type is a partition type that is symmetric about a center line of the block, but where at least one of the resultant three blocks is not the same size as the other two. One preferred example is where the side blocks are ¼ the size of the block, and the center block is ½ the size of the block. An even/uniform symmetric ternary-tree partition type is a partition type that is symmetric about a center line of the block, and the resultant blocks are all the same size. Such a partition is possible if the block height or width, depending on a vertical or horizontal split, is a multiple of 3. An uneven/non-uniform asymmetric ternary-tree partition type is a partition type that is not symmetric about a center line of the block, and where at least one of the resultant blocks is not the same size as the other two.

Figure 8:
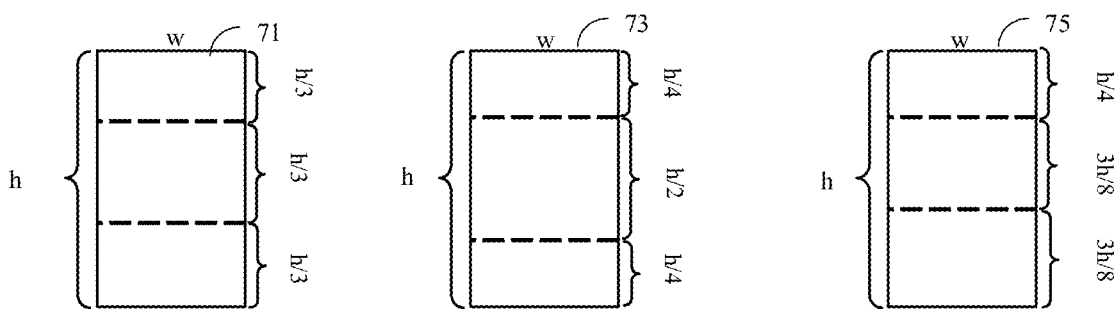
FIG. 8 is an illustrative diagram of an example of horizontal ternary-tree partition types.
Figure 9:
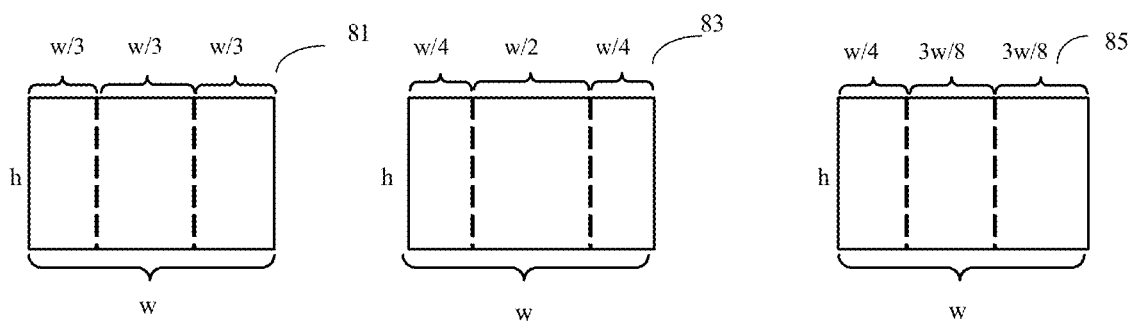
FIG. 9 is an illustrative diagram of an example of vertical ternary-tree partition types.

FIG. 8 is a conceptual diagram illustrating optional example horizontal ternary-tree partition types. FIG. 9 is a conceptual diagram illustrating optional example vertical ternary-tree partition types. In both FIG. 8 and FIG. 9, h represents the height of the block in luma or chroma samples and w represents the width of the block in luma or chroma samples. Note that the respective center line of a block do not represent the boundary of the block (i.e., the ternary-tree partitions do not split a block through the center line). Rather, the center line\ are used to depict whether or not a particular partition type is symmetric or asymmetric relative to the center line of the original block. The center line are also along the direction of the split.

As shown in FIG. 8, block 71 is partitioned with a horizontal even/uniform symmetric partition type. The horizontal even/uniform symmetric partition type produces symmetrical top and bottom halves relative to the center line of block 71. The horizontal even/uniform symmetric partition type produces three sub-blocks of equal size, each with a height of h/3 and a width of w. The horizontal even/uniform symmetric partition type is possible when the height of block 71 is evenly divisible by 3.

Block 73 is partitioned with a horizontal uneven/non-uniform symmetric partition type. The horizontal uneven/non-uniform symmetric partition type produces symmetrical top and bottom halves relative to the center line of block 73. The horizontal uneven/non-uniform symmetric partition type produces two blocks of equal size (e.g., the top and bottom blocks with a height of h/4), and a center block of a different size (e.g., a center block with a height of h/2). In one example, according to the horizontal uneven/non-uniform symmetric partition type, the area of the center block is equal to the combined areas of the top and bottom blocks. In some examples, the horizontal uneven/non-uniform symmetric partition type may be preferred for blocks having a height that is a power of 2 (e.g., 2, 4, 8, 16, 32, etc.).

Block 75 is partitioned with a horizontal uneven/non-uniform asymmetric partition type. The horizontal uneven/non-uniform asymmetric partition type does not produce a symmetrical top and bottom half relative to the center line of block 75 (i.e., the top and bottom halves are asymmetric). In the example of FIG. 8, the horizontal uneven/non-uniform asymmetric partition type produces a top block with height of h/4, a center block with height of 3h/8, and a bottom block with a height of 3h/8. Of course, other asymmetric arrangements may be used.

As shown in FIG. 9, block 81 is partitioned with a vertical even/uniform symmetric partition type. The vertical even/uniform symmetric partition type produces symmetrical left and right halves relative to the center line of block 81. The vertical even/uniform symmetric partition type produces three sub-blocks of equal size, each with a width of w/3 and a height of h. The vertical even/uniform symmetric partition type is possible when the width of block 81 is evenly divisible by 3.

Block 83 is partitioned with a vertical uneven/non-uniform symmetric partition type. The vertical uneven/non-uniform symmetric partition type produces symmetrical left and right halves relative to the center line of block 83. The vertical uneven/non-uniform symmetric partition type produces symmetrical left and right halves relative to the center line of 83. The vertical uneven/non-uniform symmetric partition type produces two blocks of equal size (e.g., the left and right blocks with a width of w/4), and a center block of a different size (e.g., a center block with a width of w/2). In one example, according to the vertical uneven/non-uniform symmetric partition type, the area of the center block is equal to the combined areas of the left and right blocks. In some examples, the vertical uneven/non-uniform symmetric partition type may be preferred for blocks having a width that is a power of 2 (e.g., 2, 4, 8, 16, 32, etc.).

Block 85 is partitioned with a vertical uneven/non-uniform asymmetric partition type. The vertical uneven/non-uniform asymmetric partition type does not produce a symmetrical left and right half relative to the center line of block 85 (i.e., the left and right halves are asymmetric). In the example of FIG. 9, the vertical uneven/non-uniform asymmetric partition type produces a left block with width of w/4, a center block with width of 3w/8, and a right block with a width of 3w/8. Of course, other asymmetric arrangements may be used.

In addition to the parameters for QTBT, the following parameters are defined for the MTT partitioning scheme.
  MaxMttDepth: the maximum multi-type tree depth
  MaxMttDepth offset: the maximum multi-type tree depth offset
  MaxTtSize: the maximum allowed ternary tree root node size
  MinTtSize: the minimum allowed ternary tree root node size
  MinCbSize: the minimum allowed coding block size The embodiments of the disclosure, may be implemented by a video encoder or a video decoder, such as video encoder 20 of FIG. 2 or video decoder 30 of FIG. 3, in accordance with an embodiment of the present application. One or more structural elements of video encoder 20 or video decoder 30, including partition unit, may be configured to perform the techniques of embodiments of the disclosure.

Embodiments of the disclosure are described in the following.

In JVET-K1001-v4, log2_ctu_size_minus2, log2_min_qt_size_intra_slices_minus2 and log2_min_qt_size_inter_slices_minus2 is signaled in SPS, wherein log2_ctu_size_minus2 plus 2 specifies the luma coding tree block size of each CTU.

$$CtbLog2SizeY = log2\_ctu\_size\_minus2 + 2 \quad (7\text{-}5)$$

$$CtbSizeY = 1 << CtbLog2SizeY \quad (7\text{-}6)$$

$$MinCb\ Log2SizeY = 2 \quad (7\text{-}7)$$

$$MinCbSizeY = 1 << MinCb\ Log2SizeY \quad (7\text{-}8)$$

$$MinTbSizeY = 4 \quad (7\text{-}9)$$

$$MaxTbSizeY = 64 \quad (7\text{-}10)$$

log2_min_qt_size_intra_slices_minus2 plus 2 specifies the minimum luma size of a leaf block resulting from quadtree splitting of a CTU in slices with slice_type equal to 2 (I). The parameter slice_type defines a slica as I slice (value 2), P slice (1), or B slice (0). The value of log2_min_qt_size_intra_slices_minus2 shall be in the range of 0 to CtbLog2SizeY−2, inclusive.

$$MinQtLog2SizeIntraY = log2\_min\_qt\_size\_intra\_slices\_minus2 + 2 \quad (7\text{-}22)$$

log2_min_qt_size_inter_slices_minus2 plus 2 specifies the minimum luma size of a leaf block resulting from quadtree splitting of a CTU in slices with slice_type equal to 0 (B) or 1 (P). The value of log2_min_qt_size_inter_slices_minus2 shall be in the range of 0 to CtbLog2SizeY−2, inclusive.

$$MinQtLog2SizeInterY = log2\_min\_qt\_size\_inter\_slices\_minus2 + 2 \quad (7\text{-}23)$$

The MinQtSizeY is defined in (7-30), which means the minimum allowed quadtree split size in luma sample. If the coding block size is smaller than or equal to MinQtSizeY, quadtree split is not allowed.

$$MinQtLog2SizeY = (slice\_type == I)\ ?\ MinQtLog2SizeIntraY : MinQtLog2SizeInterY \quad (7\text{-}25)$$

$$MaxBtLog2SizeY = Ctb\ Log2SizeY - log2\_diff\_ctu\_max\_bt\_size \quad (7\text{-}26)$$

$$MinBtLog2SizeY = MinCbLog2SizeY \quad (7\text{-}27)$$

$$MaxTtLog2SizeY = (slice\_type == I)\ ?\ 5 : 6 \quad (7\text{-}28)$$

$$MinTtLog2SizeY = MinCbLog2SizeY \quad (7\text{-}29)$$

$$MinQtSizeY = 1 << MinQtLog2SizeY \quad (7\text{-}30)$$

$$MaxBtSizeY = 1 << MaxBtLog2SizeY \quad (7\text{-}31)$$

$$MinBtSizeY = 1 << MinBtLog2SizeY \quad (7\text{-}32)$$

$$MaxTtSizeY = 1 << MaxTtLog2SizeY \quad (7\text{-}33)$$

$$MinTtSizeY = 1 << MinTtLog2SizeY \quad (7\text{-}34)$$

$$MaxMttDepth = (slice\_type == I)\ ?\ max\_mtt\_hierarchy\_depth\_intra\_slices : max\_mtt\_hierarchy\_depth\_inter\_slices \quad (7\text{-}35)$$

Based on the semantic of log2_min_qt_size_intra_slices_minus2 and log2_min_qt_size_inter_slices_minus2, the range of log2_min_qt_size_intra_slices_minus2 and log2_min_qt_size_inter_slices_minus2 are from 0 to CtbLog2SizeY−2

Here the CtbLog2SizeY is defined in the semantic of log2_ctu_size_minus2, which means the log2 value of luma coding tree block size of each CTU, the CtbLog2SizeY in VTM2.0 is equal to 7.

Based on (7-22) and (7-23), the range of MinQtLog2SizeIntraY and MinQtLog2SizeInterY are from 2 to CtbLog2SizeY.

Base on (7-25), the range of MinQtLog2SizeY is from 2 to CtbLog2SizeY

Base on (7-30), the range of MinQtSizeY, in JVET-K1001-v4, is from (1<<2) to (1<<CtbLog2SizeY), in VTM2.0 the range is from (1<<2) to (1<<7), which is equal to from 4 to 128.

In JVET-K1001-v4, log2_diff_ctu_max_bt_size is conditional signaled in Slice header, wherein log2_diff_ctu_max_bt_size specifies the difference between the luma CTB size and the maximum luma size (width or height) of a coding block that can be split using a binary split. The value of log2_diff_ctu_max_bt_size shall be in the range of 0 to CtbLog2SizeY−MinCbLog2SizeY, inclusive.

When log2_diff_ctu_max_bt_size is not present, the value of log2_diff_ctu_max_bt_size is inferred to be equal to 2.

The MinCbLog2SizeY is defined in (7-7), which is meaning the minimum allowed coding block size.

Based on the semantic of log2_diff_ctu_max_bt_size, the range of log2_diff_ctu_max_bt_size is from 0 to CtbLog2SizeY−MinCbLog2SizeY.

Based on (7-26), the range of MaxBtLog2SizeY is from CtbLog2SizeY to MinCbLog2SizeY Based on (7-31), the range of MaxBtSizeY is from (1<<CtbLog2SizeY) to (1<<MinCbLog2SizeY)

Based on (7-7), the range of MaxBtSizeY, in JVET-K1001-v4, is from (1<<CtbLog2SizeY) to (1<<2), since in VTM2.0 CtbLog2SizeY is equal to 7, the range of MaxBtSizeY in VTM2.0 is equal to from 128 to 4.

Therefore, MinQtSizeY has the range from 4 to (1<<CtbLog2SizeY), in VTM2.0 from 4 to 128, MaxBtSizeY has the range from (1<<CtbLog2SizeY) to 4, in VTM2.0 from 128 to 4.

Accordingly, there is the possibility that MinQtSizeY is larger than MaxBtSizeY.

Based on current boundary handling in VVC 2.0, only QT and BT partition is allowed for boundary located block (TT is not allowed, and it is not allowed that no splitting is applied to the boundary located block).

If the current coding block is located on the boundary, and the current coding block size cbSizeY fulfills the following condition, MinQtSizeY>cbSizeY>MaxBtSizeY, neither QT nor BT split is possible for the current coding block. Therefore, there is no available partition mode for the current block.

In view of this problem of boundary case, to solve the mentioned problem, the lower bound of MaxBtSizeY should be limited to MinQtSizeY, to make sure that MaxBtSizeY is not smaller than MinQtSizeY.

Lower bound of MaxBtSizeY should be equal to MinQtSizeY, so the range of MaxBtSizeY should be from (1<<CtbLog2SizeY) to (1<<MinQtLog2SizeY), so the range of MaxBtLog2SizeY should be from CtbLog2SizeY to MinQtLog2SizeY, so the range of log2_diff_ctu_max_bt_size should be from 0 to CtbLog2SizeY−MinQtLog2SizeY.

The corresponding change in the draft text is in the semantic of log2_diff_ctu_max_bt_size as follows:

log2_diff_ctu_max_bt_size specifies the difference between the luma CTB size and the maximum luma size (width or height) of a coding block that can be split using a binary split. The value of log2_diff_ctu_max_bt_size shall be in the range of 0 to CtbLog2SizeY−MinQtLog2SizeY, inclusive.

The corresponding method of coding implemented by a coding device (decoder or encoder) may be as following: determining whether the current block of a picture is a boundary block; determining whether the size of the current block is larger than a minimum allowed quadtree leaf node size; if the current block is a boundary block and the size of the current block is not larger than the minimum allowed quadtree leaf node size, applying binary splitting to the current block; where the minimum allowed quadtree leaf node size is not larger than a maximum allowed binary tree root node size.

Another corresponding method of coding implemented by a coding device (decoder or encoder) may be as following: determining whether the size of a boundary block is larger than a minimum allowed quadtree leaf node size; if the size of the boundary block is not larger than the minimum allowed quadtree leaf node size, wherein the minimum allowed quadtree leaf node size is not larger than a maximum allowed binary tree root node size, applying binary splitting to the boundary block.

In an embodiment, boundary block may not comprise or be a corner block, a corner block being located on two boundaries of the picture.

Other embodiments of the disclosure are described in the following.

In JVET-K1001-v4, max_mtt_hierarchy_depth_inter_slices and max_mtt_hierarchy_depth_intra_slices is signaled in SPS, wherein max_mtt_hierarchy_depth_inter_slices specifies the maximum hierarchy depth for coding units resulting from multi-type tree splitting of a quadtree leaf in slices with slice_type equal to 0 (B) or 1 (P). The value of max_mtt_hierarchy_depth_inter_slices shall be in the range of 0 to CtbLog2SizeY−MinTbLog2SizeY, inclusive.

max_mtt_hierarchy_depth_intra_slices specifies the maximum hierarchy depth for coding units resulting from multi-type tree splitting of a quadtree leaf in slices with slice_type equal to 2 (I). The value of max_mtt_hierarchy_depth_intra_slices shall be in the range of 0 to CtbLog2SizeY−MinTbLog2SizeY, inclusive.

MinTbSizeY is defined in (7-9), which is fixed as 4, therefore MinTbLog2SizeY=log2 MinTbSizeY which is fixed as 2.

The MaxMttDepth is defined which means the maximum allowed depth of Multi-type tree partition. If the current multi-type tree partition depth greater than or equal to MaxMttDepth, Multi-type tree partition is not allowed.

Based on the semantic of max_mtt_hierarchy_depth_inter_slices and max_mtt_hierarchy_depth_intra_slices, the range of max_mtt_hierarchy_depth_inter_slices and max_mtt_hierarchy_depth_intra_slices is from 0 to CtbLog2SizeY−MinTbLog2SizeY Base on (7-35), the range of MaxMttDepth is from 0 to CtbLog2SizeY−MinTbLog2SizeY. Since in VTM2.0 CtbLog2SizeY is equal to 7, the range of MaxMttDepth is from 0 to 5.

Therefore, MaxMttDepth has the range from 0 to CtbLog2SizeY−MinTbLog2SizeY, in VTM2.0 from 0 to 5

Based on current boundary handling in VVC 2.0, only QT and BT partition is allowed for boundary located block (not allowed TT, not allowed no splitting).

If the first problem is solved (MaxBtSizeY>=MinQtSizeY), but the following condition is fulfilled, cbSizeY<=MinQtSizeY and MaxMttDepth=0, there are not enough levels of BT partition for the boundary handling.

For example, MinQtSizeY is equal to 16, MinTbSizeY is equal to 4, MaxMttDepth is 0.

If a boundary block has cbSizeY=16, and the parent partition is QT, and this block is still located on the boundary, no further partition can be performed, because the Mttdepth of current block is reached MaxMttDepth.

In view of this problem of boundary case, to solve the mentioned problem, the lower bound of MaxMttDepth should be limited to be not smaller than 1, to make sure that after QT partition, there are enough levels of multi-type tree partition for boundary case. Alternatively, the lower bound of MaxMttDepth should be limited to be not smaller than (MinQtLog2SizeY−MinTbLog2SizeY), to make sure that after QT partition, there are enough levels of multi-type tree partition for both boundary and non boundary case.

The corresponding change in the draft text is in the semantic of max_mtt_hierarchy_depth_inter_slices and max_mtt_hierarchy_depth_intra_slices as follow:

max_mtt_hierarchy_depth_inter_slices specifies the maximum hierarchy depth for coding units resulting from multi-type tree splitting of a quadtree leaf in slices with slice_type equal to 0 (B) or 1 (P). The value of max_mtt_hierarchy_depth_inter_slices shall be in the range of 1 to CtbLog2SizeY−MinTbLog2SizeY, inclusive.

max_mtt_hierarchy_depth_intra_slices specifies the maximum hierarchy depth for coding units resulting from multi-type tree splitting of a quadtree leaf in slices with slice_type equal to 2 (I). The value of max_mtt_hierarchy_depth_intra_slices shall be in the range of 1 to CtbLog2SizeY−MinTbLog2SizeY, inclusive.

Alternatively:

max_mtt_hierarchy_depth_inter_slices specifies the maximum hierarchy depth for coding units resulting from multi-type tree splitting of a quadtree leaf in slices with slice_type equal to 0 (B) or 1 (P). The value of max_mtt_hierarchy_depth_inter_slices shall be in the range of MinQtLog2SizeY−MinTbLog2SizeY to CtbLog2SizeY−MinTbLog2SizeY, inclusive.

max_mtt_hierarchy_depth_intra_slices specifies the maximum hierarchy depth for coding units resulting from multi-type tree splitting of a quadtree leaf in slices with slice type equal to 2 (I). The value of max_mtt_hierarchy_depth_intra_slices shall be in the range of MinQtLog2SizeY−MinTbLog2SizeY to CtbLog2SizeY−MinTbLog2SizeY, inclusive.

The corresponding method of coding implemented by a coding device (decoder or encoder) may be as following: dividing an image into blocks, wherein the blocks comprise a boundary block; applying binary splitting to the boundary block with a maximum boundary multi-type partition depth, wherein the maximum boundary multi-type partition depth is a sum of at least a maximum multi-type tree depth and a maximum multi-type tree depth offset, wherein the maximum multi-type tree depth is larger than 0.

In an embodiment, the maximum multi-type tree depth is larger than 0 when applying the binary splitting to the boundary block.

In an embodiment, boundary block may not comprise or be a corner block.

A further embodiment is described below.

In JVET-K1001-v7, max_mtt_hierarchy_depth_inter_slices and max_mtt_hierarchy_depth_intra_slices is signaled in SPS, wherein max_mtt_hierarchy_depth_inter_slices specifies the maximum hierarchy depth for coding units resulting from multi-type tree splitting of a quadtree leaf in slices with slice_type equal to 0 (B) or 1 (P). The value of max_mtt_hierarchy_depth_inter_slices shall be in the range of 0 to CtbLog2SizeY−MinTbLog2SizeY, inclusive.

max_mtt_hierarchy_depth_intra_slices specifies the maximum hierarchy depth for coding units resulting from multi-type tree splitting of a quadtree leaf in slices with slice_type equal to 2 (I). The value of max_mtt_hierarchy_depth_intra_slices shall be in the range of 0 to CtbLog2SizeY−MinTbLog2SizeY, inclusive.

MinTbSizeY is defined in (7-9), which is fixed as 4, therefore MinTbLog2SizeY=log2 MinTbSizeY which is fixed as 2.

MaxMttDepth is a variable which indicates the maximum allowed depth of a Multi-type tree partition. If the current multi-type tree partition depth is greater than or equal to MaxMttDepth, Multi-type tree partition is not allowed.

Based on the semantic of max_mtt_hierarchy_depth_inter_slices and max_mtt_hierarchy_depth_intra_slices, the range of max_mtt_hierarchy_depth_inter_slices and max_mtt_hierarchy_depth_intra_slices is from 0 to CtbLog2SizeY−MinTbLog2SizeY.

Base on (7-35), the range of MaxMttDepth is from 0 to CtbLog2SizeY−MinTbLog2SizeY. Since in VTM2.0 CtbLog2SizeY is equal to 7, the range of MaxMttDepth is from 0 to 5.

Therefore, MaxMttDepth has the range from 0 to CtbLog2SizeY−MinTbLog2SizeY, in VTM2.0 from 0 to 5.

Based on current boundary handling in VVC 2.0, only QT partition and BT partition are allowed for a boundary-located block. TT is not allowed, and applying no splitting is not allowed either.

If the first problem is solved (MaxBtSizeY>=MinQtSizeY), but the following condition is fulfilled:
 cbSizeY<=MinQtSizeY
 MaxMttDepth=0,
the maximum allowed depth of BT partitioning for the boundary handling will be insufficient.

For example, MinQtSizeY is equal to 16, MinTbSizeY is equal to 4, MaxMttDepth is 0.

Besides limiting the definition range of MaxMttDepth as described in the preceding embodiment, there is a further solution for resolving the problem associated with current boundary handling, which is caused by the insufficient depth of the multi-type tree partition resulting from multi-type tree splitting of a quadtree leaf In JVET-K1001-v7 Section 6.4.1 the allowed binary split process is defined.

If the multi-type tree depth from the multi-type tree partition resulting from multi-type tree splitting of a quadtree leaf (mttdepth) is greater than or equal to MaxMttDepth+depthOffset, binary tree splitting is not allowed.

Here the depthOffset is an offset of the MaxMttdepth, which is initialized as 0, and only if for the boundary located block (a block located partial inside of the picture boundary, partial outside of the picture boundary) binary tree partition is performed (i.e. the boundary located block is split using binary partitioning), the value will be increased by 1.

Under the described condition (MaxMttDepth=0 and cbSizeY<=MinQtSizeY), if the parent split of current block is quadtree split and the current block is located partially inside the picture boundary, partially outside the picture boundary, then:
 the current block needs to be split by binary tree based on current boundary handling in VVC2.0
 depthOffset is equal to 0 since no binary tree partitioning is performed on the boundary located parent block
 binary tree partitioning cannot be done because mttdepth is equal to MaxMttDepth+depthOffset (all the values are 0), which is ambiguous compared with the bullet point 1.

The described ambiguity problem can be resolved by ignoring the MaxMttDepth limitation only for the boundary handling.

When the current block is located on the picture boundary, during binary tree partitioning, the condition of MaxMttDepth or MaxMttDepth+depthOffset is not checked by the allowed binary split process. By contrast, when the current block is not located on the picture boundary, the condition of allowed binary split process is the same as in the current VVC 2.0 design, as specified, e.g., in the following excerpts from above-mentioned JVET-K1001-v7 Section 6.4.1.

6.4.1 Allowed Binary Split Process

Input to this process is a binary split mode btSplit, a coding block width cbWidth, a coding block height cbHeight, a location (x0, y0) of the top-left luma sample of the considered coding block relative to the top-left luma sample of the picture, a multi-type tree depth mttDepth, a MaxMttDepth offset depthOffset and a partition index partIdx.

Output of this process is the variable allowBtSplit.

TABLE 1

Specification of parallelTtSplit and cbSize based on btSplit [corresponding to Table 6-2 from JVET-K1001-v7].

|  | btSplit == SPLIT_BT_VER | btSplit == SPLIT_BT_HOR |
|---|---|---|
| parallelTtSplit | SPLIT_TT_VER | SPLIT_TT_HOR |
| cbSize | cbWidth | cbHeight |

The variables parallelTtSplit and cbSize are derived as specified in Table 6-2. The variable allowBtSplit is derived as follows:

If one or more of the following conditions are true, allowBtSplit is set equal to FALSE:
  cbSize is less than or equal to MinBtSizeY
  cbWidth is greater than MaxBtSizeY
  cbHeight is greater than MaxBtSizeY
  mttDepth is greater than or equal to MaxMttDepth+depthOffset and x0+cbWidth is smaller than or equal to pic_width_in_luma_samples and y0+cbHeight is smaller than or equal to pic_height_in_luma_samples Otherwise, if all of the following conditions are true, allowBtSplit is set equal to FALSE:
  btSplit is equal to SPLIT_BT_VER,
  y0+cbHeight is greater than pic_height_in_luma_samples.

Otherwise, if all of the following conditions are true, allowBtSplit is set equal to FALSE:
  btSplit is equal to SPLIT_BT_HOR,
  x0+cbWidth is greater than pic_width_in_luma_samples,
  y0+cbHeight is smaller than or equal to pic_height_in_luma_samples.

Otherwise, if all of the following conditions are true, allowBtSplit is set equal to FALSE:
  mttDepth is greater than 0
  partIdx is equal to 1
  MttSplitMode[x0][y0][mttDepth−1] is equal to parallelTtSplit.

Otherwise, allowBtSplit is set equal to TRUE.

Here pic_height_in_luma_samples is the height of the coding picture in luma samples, pic_width_in_luma_samples is the width of the coding picture in luma samples, these two parameters are kept consistent for the whole video sequence.

The variable allowBtSplit stands for the allowances of binary tree split for the current coding block, which includes both the allowances of horizontal and vertical binary tree splitting cases. Which allowance (horizontal or vertical) is checked during the process is based on the input binary split mode btSplit.

The highlighted condition (x0+cbWidth is smaller than or equal to pic_width_in_luma_samples and y0+cbHeight is smaller than or equal to pic_height_in_luma_samples) means the right-bottom corner sample of the current block is located inside of the picture frame, in other word, means the current coding block is a non-boundary block, because this coding block is not located on the picture boundary.

Accordingly, in above section 6.4.1 from JVET-K1001-v7, the condition "mttDepth is greater than or equal to MaxMttDepth+depthOffset and x0+cbWidth is smaller than or equal to pic_width_in_luma_samples and y0+cbHeight is smaller than or equal to pic_height_in_luma_samples", which is also referred to in this disclosure as "condition for not applying binary splitting", can also be formulated as follows:
  the current block is a non-boundary block not located at a boundary of the picture; and
  a multi-type tree depth, mttDepth, resulting from multi-type tree splitting of a quadtree leaf, is greater than or equal to a sum of a maximum boundary multi-type partition depth, MaxMttDepth, and an offset to the maximum boundary multi-type partition depth, depthOffset.

Therein, the depthOffset is initialized as 0 and increased by 1 if, in the multi-type splitting of the quadtree leaf, a binary tree split is performed. According to the present disclosure, if it is determined that this condition for not applying binary splitting is satisfied by the current block, binary splitting is not applied.

Accordingly, a video or still image coding (i.e. encoding or decoding) method (which may be implemented by a coding device, i.e. by a decoder 30 or an encoder 20) may comprise:
  Dividing an image into blocks, wherein the blocks comprise a boundary block; applying binary splitting to the boundary block without limitation to a maximum boundary multi-type partition depth, wherein the maximum boundary multi-type partition depth is a sum of at least a maximum multi-type tree depth and a maximum multi-type tree depth offset, wherein the maximum multi-type tree depth is larger than or equal to 0; and
  Dividing an image into blocks, wherein the blocks comprise a non-boundary block; applying binary splitting to the non-boundary block with limitation to maximum boundary multi-type partition depth, wherein the maximum boundary multi-type partition depth is a sum of at least a maximum multi-type tree depth and a maximum multi-type tree depth offset, wherein the maximum multi-type tree depth is larger than or equal to 0.

Figure 10:
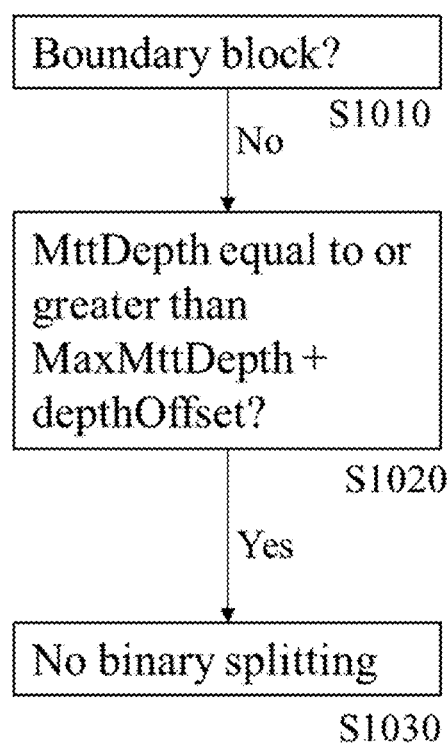
FIG. 10 and FIG. 11 are flow charts of a method for encoding or decoding a picture.

A method of encoding or decoding a picture, which is suitable for encoding or decoding and may thus be applied in encoding or decoding of a picture, is shown in FIG. 10, where method operations to be applied to a current block of the picture are shown. The method includes operations S1010 and S1020 of testing whether the above condition for not applying binary splitting is satisfied.

Namely, in operation S1010, it is tested whether the current block is a boundary block located at a boundary of the picture or a non-boundary block not located at the boundary of the picture. For instance, the block is determined to be a non-boundary block if x0+cbWidth is smaller than or equal to a picture width, pic_width_in_luma_samples, of the picture and y0+cbHeight is smaller than or equal to a picture height, pic_height_in_luma_samples, of the picture wherein (x0,y0) is a location of a top-left luma sample of the current block, cbWidth is a width of the current block, and cbHeight is a height of the current block, and otherwise determined to be a boundary block.

Further, in operation S1020, it is tested whether or not a multi-type tree depth, mttDepth, resulting from multi-type tree splitting of a quadtree leaf, is greater than or equal to a sum of a maximum boundary multi-type partition depth, MaxMttDepth, and an offset, depthOffset, to the MaxMttDepth (i.e., greater than or equal to MaxMttDepth+depthOffset). Therein, depthOffset is a depth offset, which is initialized as 0 and increased by 1 if, in the multi-type splitting of the quadtree leaf, which may include at least one of binary splitting (or "binary tree splitting") and ternary (tree) splitting, a binary tree split is performed.

In response to determining in operation S1010 that the current block is not a boundary block ("No in FIG. 10") and determining in operation S1020 that the multi-type tree depth of the current block is at least the sum of MaxMttDepth and depthOffset, binary splitting is not applied to the current block, operation S1030).

Figure 11:
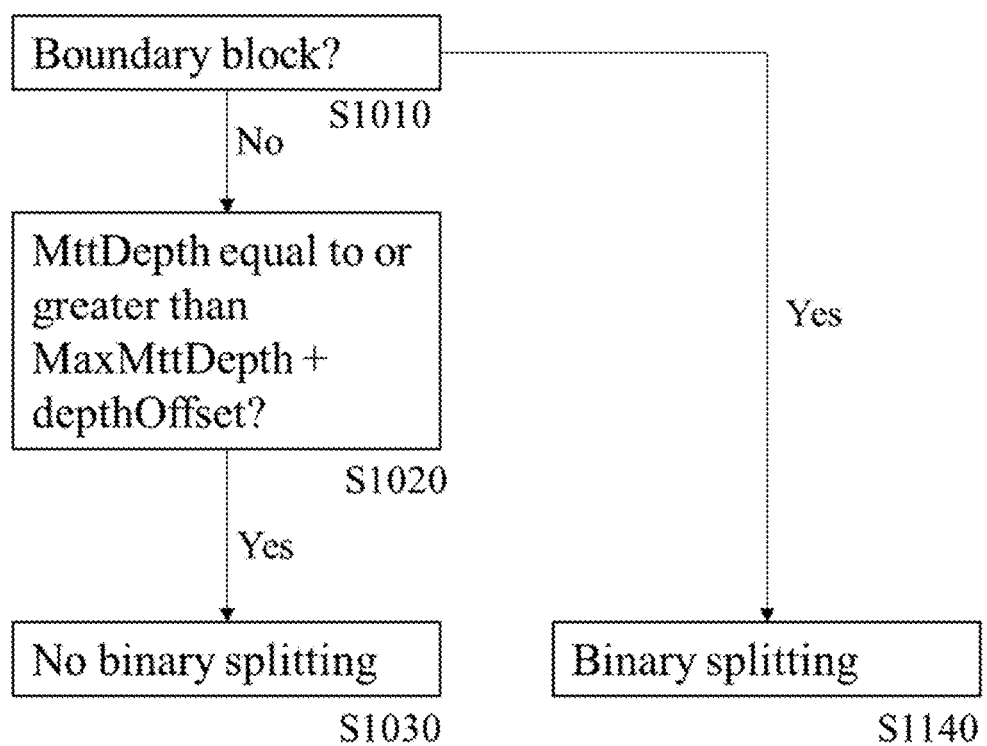

An example of the above method is shown in FIG. 11, where operations S1010 to S1030 are the same as the corresponding operations show in FIG. 10. In addition, if it is determined as a result of operation S1010 that the current block is a boundary block located at the boundary of the picture ("Yes" in FIG. 11), binary splitting is applied, S1140, irrespective of whether or not mttDepth is greater than or equal to the sum of the MaxMttDepth and the depthOffset.

In general, the order of operations S1010 and S1020 from FIG. 10 is interchangeable. However, if operation S1010, if operation S1010 is performed before operation S1020 and it is determined in operation S1010 that the current block is a boundary block (i.e. already the first part of the condition for not applying binary splitting is not satisfied), binary splitting can already be applied in operation S1140 without performing operation S1020 of checking the second part of the condition for not applying binary splitting whether the multi-type tree depth is greater than or equal to the sum of MaxMttDepth and depthOffset.

Figure 12:
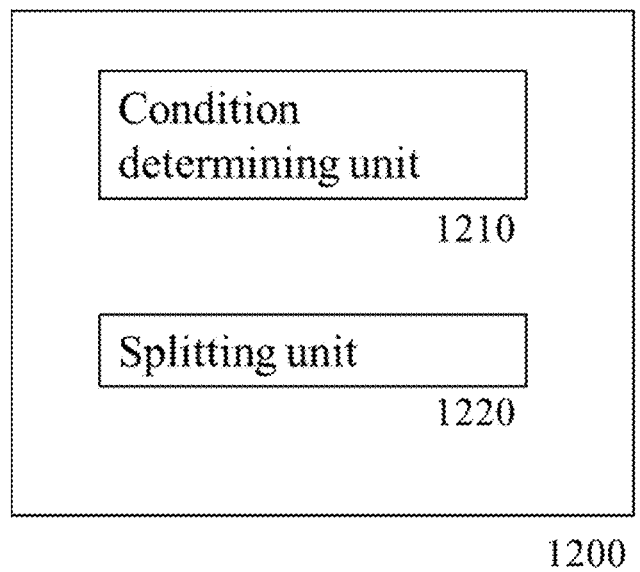
FIG. 12 is a block diagram of an apparatus for encoding or decoding a picture.

In correspondence with the above method of encoding or decoding a picture, also provided is an apparatus 1200 suitable for encoding or decoding a picture including a current block, which is shown in FIG. 12. The apparatus 1200 comprises circuitry 1210, 1220, e.g. processing circuitry, which is configured to or adapted to determine whether or not the above-mentioned condition for not applying binary splitting is satisfied and which is configured not to apply binary splitting to the current block in response to determining that the condition is satisfied.

For instance, as can be seen from FIG. 12, the apparatus 1200 or its processing circuitry comprises a condition determining unit 1210 and a splitting unit 1220. In particular, the condition determining unit 1210 is configured to determine whether or not the condition for not applying boundary splitting is satisfied.

Figure 13:
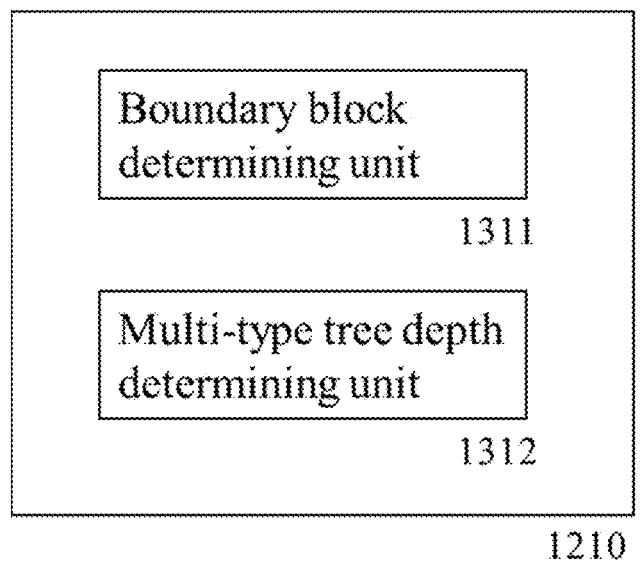
FIG. 13 is a block diagram of a unit for determining a condition for applying or not applying binary splitting.

As is further shown in FIG. 13, the condition determining unit 1210 may comprise a boundary block determining unit 1311 configured to determine whether or not the current block is a boundary block, and a multi-type tree-depth determining unit 1312 configured to determine whether or not the multi-type tree depth of the current block is equal to or greater than a sum of MaxMttDepth and the offset depthOffset to MaxMttDepth.

In response to the processing by the condition determining unit 1210, the splitting unit 1220 performs splitting of the current block, wherein binary splitting is not applied if the condition determining unit 1210 has determined that the condition for not applying binary splitting is satisfied. On the other hand, the splitting unit 1220 may perform binary splitting in response to the condition determining unit 1210 determining that the current block is a boundary block, irrespective of and without waiting for the condition determining unit 1210 or the multi-type tree depth determining unit 1312 determining whether or not the multi-type tree depth of the current block is equal to or greater than a sum of MaxMttDepth and the depth offset.

The apparatus 1200 for encoding or decoding a picture may be comprised by an encoder 20 such as a picture encoder or video encoder, e.g. as shown in FIG. 2, or by a decoder 30 such as a picture decoder or video decoder, e.g. as shown in FIG. 3. For instance, the apparatus 1200 may be included in the partitioning unit mentioned above in section "Partitioning" or the partitioning unit mentioned in the description of the decoder 30 accompanying FIG. 3.

Further provided is a computer program or compute program product comprising a program code for performing the method according to any embodiments of the present disclosure. When the program is executed on a computer, the program code causes the computer to perform the operations of the method.

By providing and applying the condition for not applying binary splitting, the present disclosure facilitates flexibly controlling the application of multi-type tree splitting such as binary splitting. E.g., compared to the preceding embodiment, the benefit of this embodiment is that Multi-type tree splitting can be easily turned off completely for non-boundary located blocks (namely, by setting MaxMttDepth as 0).

In the following, another embodiment of the present disclosure will be described:

In JVET-K1001-v4, if MinQtSizeY>MaxBtSizeY and MinQtSizeY>MaxTtSizeY, and if cbSize=MinQtsizeY, the partition cannot reach the MinCbSizeY (MinTbSizeY and MinCbsizeY are fixed and equal to 4), because there is no possible partition mode available.

In view of this problem of non-boundary case or boundary case, to solve the mentioned problem, the lower bound of MaxBtSizeY should be limited to MinQtSizeY, to make sure MaxBtSizeY is not smaller than MinQtSizeY, or the lower bound of MaxTtSizeY should be limited to MinQtSizeY, to make sure MaxTtSizeY is not smaller than MinQtSizeY.

log2_diff_ctu_max_bt_size specifies the difference between the luma CTB size and the maximum luma size (width or height) of a coding block that can be split using a binary split. The value of log2_diff_ctu_max_bt_size shall be in the range of 0 to CtbLog2SizeY−MinQtLog2SizeY, inclusive.

Additionally or alternatively, log2_min_qt_size_intra_slices_minus2 plus 2 specifies the minimum luma size of a leaf block resulting from quadtree splitting of a CTU in slices with slice_type equal to 2 (I). The value of log2_min_qt_size_intra_slices_minus2 shall be in the range of 0 to MaxTtLog2SizeY−2, inclusive.

log2_min_qt_size_inter_slices_minus2 plus 2 specifies the minimum luma size of a leaf block resulting from quadtree splitting of a CTU in slices with slice_type equal to 0 (B) or 1 (P). The value of log2_min_qt_size_inter_slices_minus2 shall be in the range of 0 to MaxTtLog2SizeY−2, inclusive.

The corresponding method of coding implemented by a coding device (decoder or encoder) may be as following:

Determining whether the size of a current block is larger than a minimum allowed quadtree leaf node size; if the size of the current block is not larger than the minimum allowed quadtree leaf node size, applying multi-type tree splitting to the current block, wherein the minimum allowed quadtree leaf node size is not larger than a maximum allowed binary tree root node size or the minimum allowed quadtree leaf node size is not larger than a maximum allowed ternary tree root node size.

In an embodiment, the minimum allowed quadtree leaf node size is not larger than a maximum allowed binary tree root node size and the minimum allowed quadtree leaf node size is not larger than a maximum allowed ternary tree root node size.

In an embodiment, the applying multi-type tree splitting to the current block comprises applying ternary splitting to the current block, or applying binary splitting to the current block.

In an embodiment, boundary block may not comprise or be a corner block.

In the following, another embodiments of the disclosure will be described:

If MaxBtSizeY>=MinQtSizeY, MinQtSizeY>MinTbLog2SizeY and MaxMttDepth< (MinQtLog2SizeY−MinTbLog2SizeY), and If cbSize=MinQtsizeY, the partition cannot reach the MinCbSizeY, because there are not enough levels of multi-type tree partition are allowed.

In view of this problem of non-boundary case or boundary case, to solve the mentioned problem, the lower bound of MaxMttDepth should be limited to (MinQtLog2SizeY−MinTbLog2SizeY), to make sure after QT partition, there are enough levels of multi-type tree partition for both boundary and non boundary case.

The corresponding change in the draft text is in the semantic of max_mtt_hierarchy_depth_inter_slices and max_mtt_hierarchy_depth_intra_slices as follow:

max_mtt_hierarchy_depth_inter_slices specifies the maximum hierarchy depth for coding units resulting from multi-type tree splitting of a quadtree leaf in slices with slice_type equal to 0 (B) or 1 (P). The value of max_mtt_hierarchy_depth_inter_slices shall be in the range of MinQtLog2SizeY−MinTbLog2SizeY to CtbLog2SizeY−MinTbLog2SizeY, inclusive.

max_mtt_hierarchy_depth_intra_slices specifies the maximum hierarchy depth for coding units resulting from multi-type tree splitting of a quadtree leaf in slices with slice type equal to 2 (I). The value of max_mtt_hierarchy_depth_intra_slices shall be in the range of MinQtLog2SizeY−MinTbLog2SizeY to CtbLog2SizeY−MinTbLog2SizeY, inclusive.

The corresponding method of coding implemented by a coding device (decoder or encoder) may be as following:

Dividing an image into blocks;

Applying multi-type tree splitting to a block of the blocks with a final maximum multi-type tree depth, wherein the final maximum multi-type tree depth is a sum of at least a maximum multi-type tree depth and a maximum multi-type tree depth offset, wherein the maximum multi-type tree depth is larger than or equal to subtraction of Log2 value of minimum allowed transform block size from Log2 value of minimum allowed quadtree leaf node size, or the maximum multi-type tree depth is larger than or equal to subtraction of Log2 value of minimum allowed coding block size from Log2 value of minimum allowed quadtree leaf node size.

In an embodiment, the block is a non-boundary block.

In an embodiment, the maximum multi-type tree depth offset is 0.

In an embodiment, the block is a boundary block and the multi-type tree splitting is binary splitting.

In an embodiment, the multi-type tree splitting is ternary splitting.

In an embodiment, boundary block may not comprise or be a corner block.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, integrated circuitry (ICs) such as application specific integrated circuits (ASICs), field programmable logic/gate arrays (FPGAs), or other equivalent integrated or discrete logic circuitry. Accordingly, the terms "processor,", "processing circuitry", and "circuitry" as used herein may refer to any of the foregoing structure or any other structure suitable for implementation of the techniques described herein. The aforementioned (processing) circuitry and units thereof may be implemented in a common integrated circuit or as respectively dedicated integrated circuits. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Summarizing, a method of and an apparatus for encoding and decoding is are provided. The method comprises determining whether, as a condition for not applying binary splitting to a current block, determining whether the current block is a boundary block and whether a multi-type tree depth resulting from multi-type tree splitting of a quadtree leaf, is equal to or greater than a sum of a maximum boundary multi-type partition depth and a depth offset. Binary splitting is applied in accordance with a result of determining whether the condition is satisfied.

Below is a non-exhaustive list of embodiments of the invention.

A method of encoding or decoding a picture, comprising for a current block of the picture: not applying binary splitting to the current block in response to determining that the following first condition is satisfied: mttDepth is greater than or equal to MaxMttDepth+depthOffset and x0+cb- Width is smaller than or equal to pic_width_in_luma_samples and y0+cbHeight is smaller than or equal to pic_height_in_luma_samples.

The method further includes: setting a variable allowBtSplit to FALSE if the first condition is satisfied; and applying or not applying binary splitting to the current block based on the variable allowBtSplit.

The applying or not applying binary splitting to the current block based on the variable allowBtSplit comprises: applying binary splitting to the current block when the variable allowBtSplit is equal to TRUE; and not applying binary splitting to the current block when the variable allowBtSplit is equal to FALSE.

The picture is a frame of a video sequence.

An encoder comprising processing circuitry for carrying out the above method.

A decoder comprising processing circuitry for carrying out the above method.

A computer program product comprising a program code for performing the above method.

A decoder, comprising: one or more processors; and a non-transitory computer-readable storage medium coupled to the processors and storing programming for execution by the processors, wherein the programming, when executed by the processors, configures the decoder to carry out the above method.

An encoder, comprising: one or more processors; and a non-transitory computer-readable storage medium coupled to the processors and storing programming for execution by the processors, wherein the programming, when executed by the processors, configures the encoder to carry out the above method.

The invention claimed is:

1. A method of encoding or decoding a picture, comprising:
    for a current block of the picture, determining whether the following condition is satisfied:
        the current block is a non-boundary block not located at a boundary of the picture, and
        a multi-type tree depth (mttDepth) resulting from multi-type tree splitting of a quadtree leaf is greater than or equal to a sum of a maximum boundary multi-type partition depth (MaxMttDepth) and an offset (depthOffset) to the MaxMttDepth,
        wherein the depthOffset is initialized as 0 and incremented by 1 if, in the multi-type splitting of the quadtree leaf, a binary tree split is performed; and
    not applying binary splitting to the current block in response to determining that the condition is satisfied.

2. The method according to claim 1, further comprising applying binary splitting to the current block in response to determining that the current block is a boundary block located at the boundary of the picture irrespective of whether the mttDepth is greater than or equal to the sum of the MaxMttDepth and the depthOffset.

3. The method of claim 1, wherein the multi-type tree splitting includes at least one of binary splitting or ternary splitting.

4. The method according to claim 1, wherein the current block is determined not to be a boundary block located at the boundary if x0+cbWidth is smaller than or equal to a picture width, pic_width_in_luma_samples, of the picture and y0+cbHeight is smaller than or equal to a picture height, pic_height_in_luma_samples, of the picture wherein
    (x0,y0) is a location of a top-left luma sample of the current block, cbWidth is a width of the current block, and cbHeight is a height of the current block.

5. The method of claim 1, further comprising:
    setting a variable allowBtSplit to FALSE if the condition is satisfied; and
    applying binary splitting to the current block based on the variable allowBtSplit.

6. The method of claim 5, wherein applying binary splitting to the current block based on the variable allowBtSplit comprises:
    applying binary splitting to the current block when the variable allowBtSplit is equal to TRUE; and
    not applying binary splitting to the current block when the variable allowBtSplit is equal to FALSE.

7. The method according to claim 1, wherein the MaxMttDepth is set as 0.

8. The method of claim 1, wherein the picture is a frame of a video sequence.

9. An apparatus for encoding or decoding a picture having a current block, comprising:
    processing circuitry configured to:
        determine whether or not the following condition is satisfied:
            the current block is a non-boundary block not located at a boundary of the picture, and
            a multi-type tree depth (mttDepth) resulting from multi-type tree splitting of a quadtree leaf is greater than or equal to a sum of a maximum boundary multi-type partition depth (MaxMttDepth) and an offset (depthOffset) to the MaxMttDepth,
            wherein the depthOffset is initialized as 0 and incremented by 1 if, in the multi-type splitting of the quadtree leaf, a binary tree split is performed; and
        not to apply binary splitting to the current block in response to determining that the condition is satisfied.

10. The apparatus according to claim 9, wherein the processing circuitry is configured to apply binary splitting to the current block in response to determining that the current block is a boundary block located at the boundary of the picture irrespective of whether the mttDepth is greater than or equal to the sum of the MaxMttDepth and the depthOffset.

11. The apparatus according to claim 9, wherein the multi-type tree splitting includes at least one of binary splitting or ternary splitting.

12. The apparatus according to claim 9, wherein the processing circuitry is configured to determine that the current block is not a boundary block located at the boundary if and x0+cbWidth is smaller than or equal to a picture width, pic_width_in_luma_samples, of the picture and y0+cbHeight is smaller than or equal to a picture height, pic_height_in_luma_samples, of the picture, wherein (x0, y0) is a location of a top-left luma sample of the current block, cbWidth is a width of the current block, and cbHeight is a height of the current block.

13. The apparatus according to claim 9, wherein the processing circuitry is configured to set a variable allowBtSplit to FALSE if the condition is satisfied; and apply binary splitting to the current block based on the variable allowBtSplit.

14. The apparatus according to claim 13, wherein in applying binary splitting to the current block based on the variable allowBtSplit, the processing circuitry is configured
    to apply binary splitting to the current block when the variable allowBtSplit is equal to TRUE; and
    not to apply binary splitting to the current block when the variable allowBtSplit is equal to FALSE.

15. The apparatus according to claim 9, wherein the MaxMttDepth is set as 0.

16. The apparatus according to claim 9, wherein the picture is a frame of a video sequence.

17. A non-transitory machine-readable medium having instructions stored therein, which when executed by a processor, cause the processor to perform a method of encoding or decoding a picture, the method comprising:
for a current block of the picture, determining whether the following condition is satisfied:
the current block is a non-boundary block not located at a boundary of the picture, and
a multi-type tree depth (mttDepth) resulting from multi-type tree splitting of a quadtree leaf is greater than or equal to a sum of a maximum boundary multi-type partition depth (MaxMttDepth) and an offset (depthOffset) to the MaxMttDepth,
wherein the depthOffset is initialized as 0 and incremented by 1 if, in the multi-type splitting of the quadtree leaf, a binary tree split is performed; and
not applying binary splitting to the current block in response to determining that the condition is satisfied.

18. The machine-readable medium according to claim 17, wherein the method further comprises applying binary splitting to the current block in response to determining that the current block is a boundary block located at the boundary of the picture irrespective of whether the mttDepth is greater than or equal to the sum of the MaxMttDepth and the depthOffset.

19. The machine-readable medium of claim 17, wherein the multi-type tree splitting includes at least one of binary splitting or ternary splitting.

20. The machine-readable medium according to claim 17, wherein the current block is determined not to be a boundary block located at the boundary if x0+cbWidth is smaller than or equal to a picture width, pic_width_in_luma_samples, of the picture and y0+cbHeight is smaller than or equal to a picture height, pic_height_in_luma_samples, of the picture wherein
(x0,y0) is a location of a top-left luma sample of the current block, cbWidth is a width of the current block, and cbHeight is a height of the current block.

21. The machine-readable medium of claim 17, wherein the method further comprises:
setting a variable allowBtSplit to FALSE if the condition is satisfied; and
applying binary splitting to the current block based on the variable allowBtSplit.

22. The machine-readable medium of claim 21, wherein applying binary splitting to the current block based on the variable allowBtSplit comprises:
applying binary splitting to the current block when the variable allowBtSplit is equal to TRUE; and
not applying binary splitting to the current block when the variable allowBtSplit is equal to FALSE.

* * * * *